US012103528B2

(12) United States Patent
Ito et al.

(10) Patent No.: US 12,103,528 B2
(45) Date of Patent: Oct. 1, 2024

(54) DRIVING ASSISTANCE DEVICE

(71) Applicant: TOYOTA JIDOSHA KABUSHIKI KAISHA, Aichi-ken (JP)

(72) Inventors: Shogo Ito, Shizuoka-ken (JP); Kohei Tochigi, Shizuoka-ken (JP); Kumiko Kondo, Shizuoka-ken (JP); Shinya Kawamata, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 17/728,411

(22) Filed: Apr. 25, 2022

(65) Prior Publication Data

US 2022/0340131 A1    Oct. 27, 2022

(30) Foreign Application Priority Data

Apr. 27, 2021    (JP) ................................. 2021-074847

(51) Int. Cl.
*B60W 30/14*    (2006.01)
*B60W 30/16*    (2020.01)
(Continued)

(52) U.S. Cl.
CPC ........ *B60W 30/146* (2013.01); *B60W 30/162* (2013.01); *B60W 30/18159* (2020.02);
(Continued)

(58) Field of Classification Search
CPC ............. B60W 30/146; B60W 30/162; B60W 30/18159; B60W 40/04; B60W 2420/403;
(Continued)

(56) References Cited

U.S. PATENT DOCUMENTS 11,897,508 B2 *   2/2024   Shalev-Shwartz .... G01S 13/931

FOREIGN PATENT DOCUMENTS

EP          3407329 A1    11/2018
JP     2010-221858 A    10/2010
(Continued)

OTHER PUBLICATIONS

Machine translation of JP2017149377A (reported on Aug. 30, 2023 IDS), downloaded from EspaceNet Mar. 22, 2024 (Year: 2024).*
(Continued)

*Primary Examiner* — Peter D Nolan
*Assistant Examiner* — Tanya C Sienko
(74) *Attorney, Agent, or Firm* — Dinsmore & Shohl LLP

(57) ABSTRACT

A driving assistance device configured to execute deceleration assistance for a driver's vehicle when the driver's vehicle turns right or left at an intersection is configured to recognize, based on a detection result from an external sensor of the driver's vehicle, an adjacent vehicle traveling in an adjacent lane adjacent to a traveling lane of the driver's vehicle, determine whether the adjacent vehicle turns in the same direction of the driver's vehicle at the intersection based on the detection result from the external sensor when the adjacent vehicle is recognized and the driver's vehicle turns right or left at the intersection, and execute the deceleration assistance to cause a vehicle-to-vehicle distance between the driver's vehicle and the adjacent vehicle to reach a distance equal to or larger than a target driver's vehicle-to-adjacent vehicle distance when the driving assistance device determines that the adjacent vehicle turns in the same direction.

15 Claims, 15 Drawing Sheets

(51) Int. Cl.
*B60W 30/18* (2012.01)
*B60W 40/04* (2006.01)
*G06V 20/58* (2022.01)
*H04W 4/46* (2018.01)

(52) U.S. Cl.
CPC ............ *B60W 40/04* (2013.01); *G06V 20/58* (2022.01); *H04W 4/46* (2018.02); *B60W 2420/403* (2013.01); *B60W 2552/45* (2020.02); *B60W 2554/4023* (2020.02); *B60W 2554/4044* (2020.02); *B60W 2554/80* (2020.02); *B60W 2556/40* (2020.02); *B60W 2556/65* (2020.02)

(58) Field of Classification Search
CPC ..... B60W 2552/45; B60W 2554/4023; B60W 2554/4044; B60W 2554/80; B60W 2556/40; B60W 2556/65; G06V 20/58; H04W 4/46
See application file for complete search history.

(56) References Cited

FOREIGN PATENT DOCUMENTS

| | | | |
|---|---|---|---|
| JP | 2011-129013 | A | 6/2011 |
| JP | 2013-003775 | A | 1/2013 |
| JP | 2017-045130 | A | 3/2017 |
| JP | 2017-149377 | A | 8/2017 |
| JP | 2020-201734 | A | 12/2020 |
| KR | 102119642 | B1 * | 5/2020 ................ B60T 8/32 |

OTHER PUBLICATIONS

Machine translation of JP2020201734A (reported on Aug. 30, 2023 IDS), downloaded from EspaceNet Mar. 22, 2024 (Year: 2024).*
Machine translation of KR 10-2119642, downloaded from EspaceNet Mar. 22, 2024 (Year: 2024).*

* cited by examiner

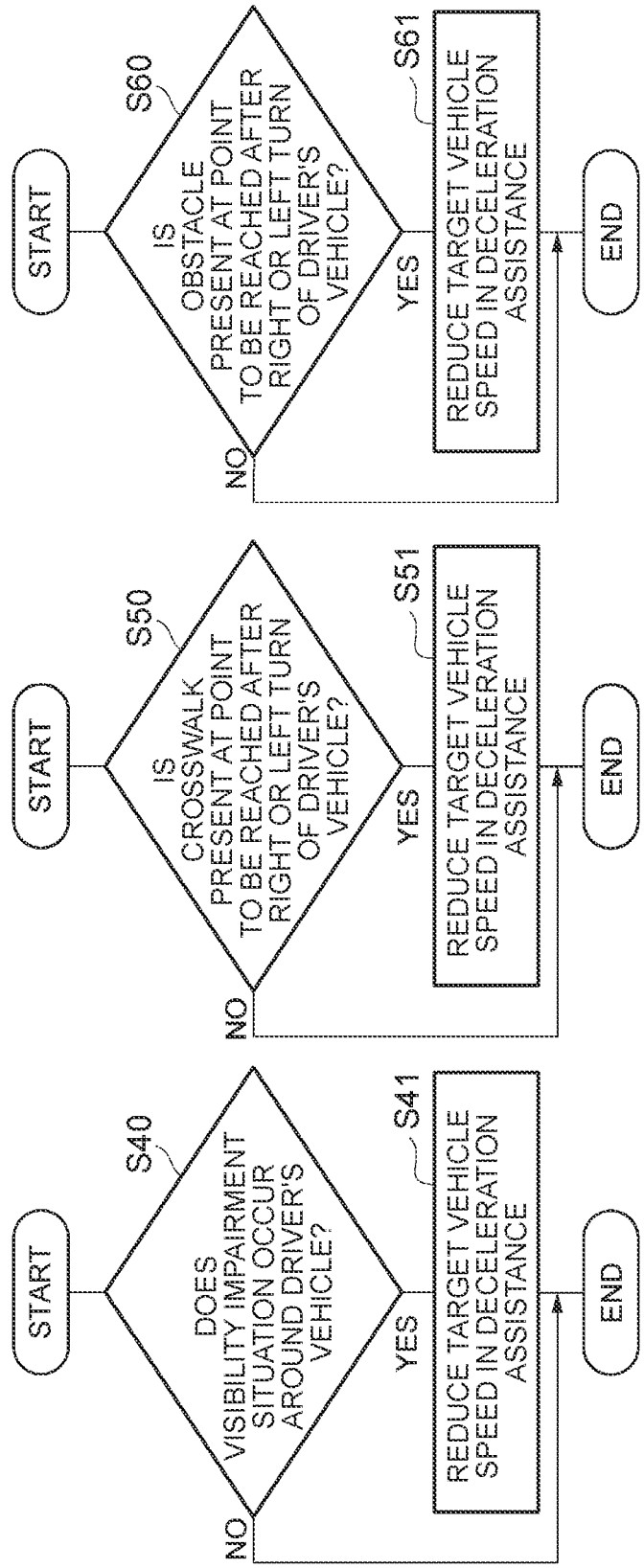

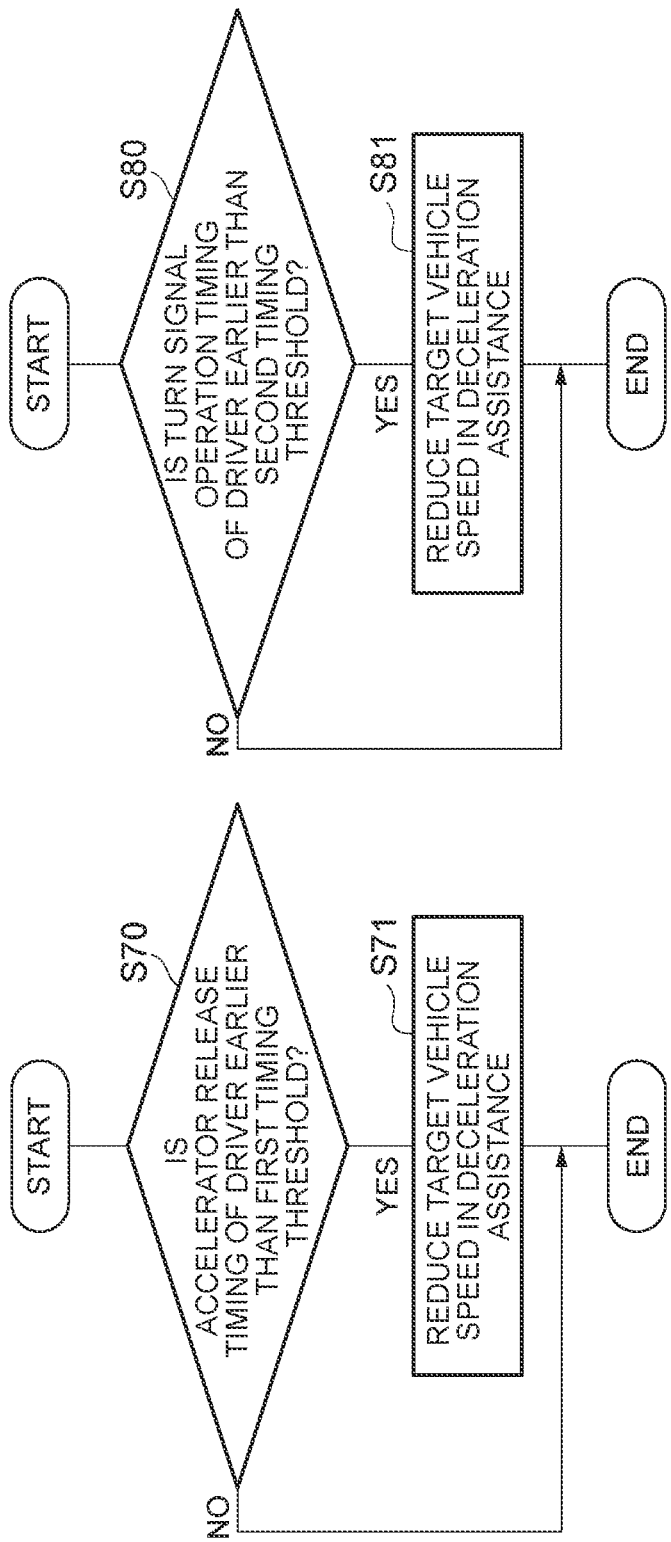

DRIVING ASSISTANCE DEVICE

CROSS-REFERENCE TO RELATED APPLICATION

This application claims priority to Japanese Patent Application No. 2021-074847 filed on Apr. 27, 2021, incorporated herein by reference in its entirety.

BACKGROUND

1. Technical Field

The present disclosure relates to a driving assistance device.

2. Description of Related Art

Japanese Unexamined Patent Application Publication No. 2010-221858 (JP 2010-221858 A) is known as a technical document relating to a driving assistance device. JP 2010-221858 A discloses a driving assistance device that assists deceleration of a driver's vehicle at a point that is a predetermined distance behind an intersection so that the driver's vehicle passes through the intersection at a set appropriate speed.

SUMMARY

When a driver's vehicle enters an intersection from a road having a plurality of lanes and turns right or left, there may be an adjacent vehicle entering the intersection. When the deceleration is uniformly assisted without considering the presence of the adjacent vehicle, the driver may have discomfort.

A first aspect of the present disclosure relates to a driving assistance device configured to execute deceleration assistance for a driver's vehicle when the driver's vehicle turns right or left at an intersection. The driving assistance device includes an adjacent vehicle recognizer configured to recognize, based on a detection result from an external sensor of the driver's vehicle, an adjacent vehicle traveling in an adjacent lane that is adjacent to a traveling lane of the driver's vehicle, an adjacent vehicle travel determiner configured to determine whether the adjacent vehicle turns in the same direction of the driver's vehicle at the intersection based on adjacent vehicle information acquired by vehicle-to-vehicle communication with the adjacent vehicle or the detection result from the external sensor when the adjacent vehicle is recognized by the adjacent vehicle recognizer and the driver's vehicle turns right or left at the intersection, and a deceleration assistance executer configured to execute the deceleration assistance to cause a vehicle-to-vehicle distance between the driver's vehicle and the adjacent vehicle in a traveling direction of the driver's vehicle to reach a distance equal to or larger than a preset target driver's vehicle-to-adjacent vehicle distance when the adjacent vehicle travel determiner determines that the adjacent vehicle turns in the same direction of the driver's vehicle.

According to the first aspect, when determination is made that the adjacent vehicle turns in the same direction as that of the driver's vehicle while the driver's vehicle turns right or left at the intersection, the deceleration is assisted to cause the vehicle-to-vehicle distance between the driver's vehicle and the adjacent vehicle in the traveling direction of the driver's vehicle to reach the distance equal to or larger than the target driver's vehicle-to-adjacent vehicle distance. Thus, the driver's discomfort with the deceleration assistance can be reduced as compared with the case where the deceleration is assisted without considering the adjacent vehicle.

In the first aspect, the driving assistance device may include a preceding vehicle recognizer configured to recognize, based on the detection result from the external sensor, a preceding vehicle traveling ahead of the driver's vehicle, and a large-sized vehicle determiner configured to determine whether the preceding vehicle is a large-sized vehicle based on preceding vehicle information acquired by vehicle-to-vehicle communication with the preceding vehicle or the detection result from the external sensor when the preceding vehicle is recognized by the preceding vehicle recognizer. The deceleration assistance executer may be configured to execute the deceleration assistance to increase a vehicle-to-vehicle distance between the driver's vehicle and the preceding vehicle when the large-sized vehicle determiner determines that the preceding vehicle is the large-sized vehicle as compared with a case where the large-sized vehicle determiner does not determine that the preceding vehicle is the large-sized vehicle.

According to the configuration described above, when determination is made that the preceding vehicle is a large-sized vehicle while the driver's vehicle turns right or left at the intersection, the deceleration is assisted to increase the vehicle-to-vehicle distance between the driver's vehicle and the preceding vehicle in the traveling direction of the driver's vehicle as compared with the case where determination is not made that the preceding vehicle is a large-sized vehicle. Thus, the driver's discomfort with the deceleration assistance can be reduced as compared with a case where the deceleration is assisted without considering whether the preceding vehicle is a large-sized vehicle.

In the first aspect, the driving assistance device may include a visibility condition determiner configured to determine whether a visibility impairment situation occurs around the driver's vehicle based on at least one of an image captured by an external camera of the driver's vehicle, a wiper operation status of the driver's vehicle, a high beam lighting status of a headlight of the driver's vehicle, weather information around the driver's vehicle that is acquired from a communication network, and traffic-related information around the driver's vehicle that is acquired from the communication network. The deceleration assistance executer may be configured to reduce a target vehicle speed in the deceleration assistance when the visibility condition determiner determines that the visibility impairment situation occurs around the driver's vehicle as compared with a case where visibility condition determiner does not determine that the visibility impairment situation occurs around the driver's vehicle.

According to the configuration described above, when the visibility condition determiner determines that the visibility impairment situation occurs around the driver's vehicle, the driving assistance device reduces the target vehicle speed in the deceleration assistance as compared with the case where determination is not made that the visibility impairment situation occurs around the driver's vehicle. Thus, the driver's discomfort with the deceleration assistance can be reduced as compared with the case where the visibility impairment situation is not taken into consideration.

In the first aspect, the driving assistance device may include a crosswalk determiner configured to determine whether a crosswalk is present at a point to be reached after a right or left turn of the driver's vehicle based on at least one of a position of the driver's vehicle on a map and map information, the detection result from the external sensor, and traffic-related information around the driver's vehicle that is acquired from a communication network. The deceleration assistance executer may be configured to reduce a target vehicle speed in the deceleration assistance when the crosswalk determiner determines that the crosswalk is present at the point to be reached after the right or left turn of the driver's vehicle as compared with a case where the crosswalk determiner does not determine that the crosswalk is present at the point to be reached after the right or left turn of the driver's vehicle.

According to the configuration described above, when the crosswalk determiner determines that the crosswalk is present at the point to be reached after the right or left turn of the driver's vehicle, the target vehicle speed in the deceleration assistance is reduced as compared with the case where determination is not made that the crosswalk is present at the point to be reached after the right or left turn of the driver's vehicle. Thus, the driver's discomfort with the deceleration assistance can be reduced as compared with the case where the presence of the crosswalk is not taken into consideration.

In the first aspect, the driving assistance device may include an obstacle determiner configured to determine whether an obstacle is present at a point to be reached after a right or left turn of the driver's vehicle based on at least one of the detection result from the external sensor, surrounding environment information acquired by vehicle-to-vehicle communication with other vehicles around the driver's vehicle, and traffic-related information around the driver's vehicle that is acquired from a communication network. The deceleration assistance executer may be configured to reduce a target vehicle speed in the deceleration assistance when the obstacle determiner determines that the obstacle is present at the point to be reached after the right or left turn of the driver's vehicle as compared with a case where the obstacle determiner does not determine that the obstacle is present at the point to be reached after the right or left turn of the driver's vehicle.

According to the configuration described above, when the obstacle determiner determines that the obstacle is present at the point to be reached after the right or left turn of the driver's vehicle, the target vehicle speed in the deceleration assistance is reduced as compared with the case where determination is not made that the obstacle is present at the point to be reached after the right or left turn of the driver's vehicle. Thus, the driver's discomfort with the deceleration assistance can be reduced as compared with the case where the presence of the obstacle is not taken into consideration.

In the first aspect, the driving assistance device may include a driving operation detector configured to detect a driving operation of a driver of the driver's vehicle, and an accelerator operation determiner configured to determine whether an accelerator release timing of the driver for a right or left turn at the intersection is earlier than a first timing threshold based on a position of the driver's vehicle on a map, map information, and a result of detection of the driving operation of the driver by the driving operation detector. The deceleration assistance executer may be configured to reduce a target vehicle speed in the deceleration assistance when the accelerator operation determiner determines that the accelerator release timing is earlier than the first timing threshold as compared with a case where the accelerator operation determiner does not determine that the accelerator release timing is earlier than the first timing threshold.

According to the configuration described above, when the accelerator operation determiner determines that the accelerator release timing is earlier than the first timing threshold, the target vehicle speed in the deceleration assistance is reduced as compared with the case where determination is not made that the accelerator release timing is earlier than the first timing threshold. Thus, the driver's discomfort with the deceleration assistance can be reduced as compared with the case where the accelerator release timing is not taken into consideration.

In the first aspect, the driving assistance device may include a driving operation detector configured to detect at least an operation on a turn signal as a driving operation of a driver of the driver's vehicle, and a turn signal operation determiner configured to determine whether a turn signal operation timing of the driver for a right or left turn at the intersection is earlier than a second timing threshold based on a position of the driver's vehicle on a map, map information, and a result of detection of the operation of the driver on the turn signal by the driving operation detector. The deceleration assistance executer may be configured to reduce a target vehicle speed in the deceleration assistance when the turn signal operation determiner determines that the turn signal operation timing is earlier than the second timing threshold as compared with a case where the turn signal operation determiner does not determine that the turn signal operation timing is earlier than the second timing threshold.

According to the configuration described above, when the turn signal operation determiner determines that the turn signal operation timing is earlier than the second timing threshold, the target vehicle speed in the deceleration assistance is reduced as compared with the case where determination is not made that the turn signal operation timing is earlier than the second timing threshold. Thus, the driver's discomfort with the deceleration assistance can be reduced as compared with the case where the turn signal operation timing is not taken into consideration.

In the first aspect, the adjacent vehicle travel determiner may be configured to determine whether the driver's vehicle turns outside or inside the adjacent vehicle when the adjacent vehicle travel determiner determines that the adjacent vehicle turns in the same direction as the direction of the driver's vehicle at the intersection, and determine whether the driver's vehicle is expected to pass through the intersection ahead of the adjacent vehicle at a vehicle speed equal to or lower than a preset upper limit target vehicle speed based on the detection result from the external sensor when the adjacent vehicle travel determiner determines that the driver's vehicle turns outside the adjacent vehicle. The deceleration assistance executer may be configured to, when the adjacent vehicle travel determiner determines that the driver's vehicle is expected to pass through the intersection ahead of the adjacent vehicle at the vehicle speed equal to or lower than the upper limit target vehicle speed, adjust a target vehicle speed in the deceleration assistance to cause the driver's vehicle to pass through the intersection ahead of the adjacent vehicle.

According to the configuration described above, when the adjacent vehicle travel determiner determines that the driver's vehicle turns outside the adjacent vehicle and the driver's vehicle is expected to pass through the intersection ahead of the adjacent vehicle at the vehicle speed equal to or lower than the upper limit target vehicle speed, the target vehicle speed in the deceleration assistance is adjusted to cause the driver's vehicle to pass through the intersection ahead of the adjacent vehicle. Thus, it is possible to reduce the occurrence of the case where the visibility of the driver of the driver's vehicle is obstructed by the preceding travel of the adjacent vehicle when the driver's vehicle turns outside the adjacent vehicle.

A second aspect of the present disclosure relates to a driving assistance device including an electronic control unit. The electronic control unit is configured to execute deceleration assistance for a driver's vehicle when the driver's vehicle turns right or left at an intersection, recognize, based on a detection result from an external sensor of the driver's vehicle, an adjacent vehicle traveling in an adjacent lane that is adjacent to a traveling lane of the driver's vehicle, determine whether the adjacent vehicle turns in the same direction as a direction of the driver's vehicle at the intersection based on adjacent vehicle information acquired by vehicle-to-vehicle communication with the adjacent vehicle or the detection result from the external sensor when the adjacent vehicle is recognized and the driver's vehicle turns right or left at the intersection, and execute the deceleration assistance to cause a vehicle-to-vehicle distance between the driver's vehicle and the adjacent vehicle in a traveling direction of the driver's vehicle to reach a distance equal to or larger than a preset target driver's vehicle-to-adjacent vehicle distance when the electronic control unit determines that the adjacent vehicle turns in the same direction as the direction of the driver's vehicle.

In the second aspect, the electronic control unit may be configured to recognize, based on the detection result from the external sensor, a preceding vehicle traveling ahead of the driver's vehicle, determine whether the preceding vehicle is a large-sized vehicle based on preceding vehicle information acquired by vehicle-to-vehicle communication with the preceding vehicle or the detection result from the external sensor when the preceding vehicle is recognized, and execute the deceleration assistance to increase a vehicle-to-vehicle distance between the driver's vehicle and the preceding vehicle when the electronic control determines that the preceding vehicle is the large-sized vehicle as compared with a case where the electronic control does not determine that the preceding vehicle is the large-sized vehicle.

In the second aspect, the electronic control unit may be configured to determine whether a visibility impairment situation occurs around the driver's vehicle based on at least one of an image captured by an external camera of the driver's vehicle, a wiper operation status of the driver's vehicle, a high beam lighting status of a headlight of the driver's vehicle, weather information around the driver's vehicle that is acquired from a communication network, and traffic-related information around the driver's vehicle that is acquired from the communication network, and reduce a target vehicle speed in the deceleration assistance when the electronic control unit determines that the visibility impairment situation occurs around the driver's vehicle as compared with a case where the electronic control unit does not determine that the visibility impairment situation occurs around the driver's vehicle.

In the second aspect, the electronic control unit may be configured to determine whether a crosswalk is present at a point to be reached after a right or left turn of the driver's vehicle based on at least one of a position of the driver's vehicle on a map and map information, the detection result from the external sensor, and traffic-related information around the driver's vehicle that is acquired from a communication network, and reduce a target vehicle speed in the deceleration assistance when the electronic control unit determines that the crosswalk is present at the point to be reached after the right or left turn of the driver's vehicle as compared with a case where the electronic control unit does not determine that the crosswalk is present at the point to be reached after the right or left turn of the driver's vehicle.

In the second aspect, the electronic control unit may be configured to determine whether an obstacle is present at a point to be reached after a right or left turn of the driver's vehicle based on at least one of the detection result from the external sensor, surrounding environment information acquired by vehicle-to-vehicle communication with other vehicles around the driver's vehicle, and traffic-related information around the driver's vehicle that is acquired from a communication network, and reduce a target vehicle speed in the deceleration assistance when the electronic control unit determines that the obstacle is present at the point to be reached after the right or left turn of the driver's vehicle as compared with a case where the electronic control unit does not determine that the obstacle is present at the point to be reached after the right or left turn of the driver's vehicle.

In the second aspect, the electronic control unit may be configured to detect a driving operation of a driver of the driver's vehicle, determine whether an accelerator release timing of the driver for a right or left turn at the intersection is earlier than a first timing threshold based on a position of the driver's vehicle on a map, map information, and a result of detection of the driving operation of the driver, and reduce a target vehicle speed in the deceleration assistance when the electronic control unit determines that the accelerator release timing is earlier than the first timing threshold as compared with a case where the electronic control unit does not determine that the accelerator release timing is earlier than the first timing threshold.

In the second aspect, the electronic control unit may be configured to detect at least an operation on a turn signal as a driving operation of a driver of the driver's vehicle, determine whether a turn signal operation timing of the driver for a right or left turn at the intersection is earlier than a second timing threshold based on a position of the driver's vehicle on a map, map information, and a result of detection of the operation of the driver on the turn signal, and reduce a target vehicle speed in the deceleration assistance when the electronic control unit determines that the turn signal operation timing is earlier than the second timing threshold as compared with a case where the electronic control unit does not determine that the turn signal operation timing is earlier than the second timing threshold.

In the second aspect, the electronic control unit may be configured to determine whether the driver's vehicle turns outside or inside the adjacent vehicle when the electronic control unit determines that the adjacent vehicle turns in the same direction as the direction of the driver's vehicle at the intersection, determine whether the driver's vehicle is expected to pass through the intersection ahead of the adjacent vehicle at a vehicle speed equal to or lower than a preset upper limit target vehicle speed based on the detection result from the external sensor when the electronic control unit determines that the driver's vehicle turns outside the adjacent vehicle, and adjust, when the electronic control unit determines that the driver's vehicle is expected to pass through the intersection ahead of the adjacent vehicle at the vehicle speed equal to or lower than the upper limit target vehicle speed, a target vehicle speed in the deceleration assistance to cause the driver's vehicle to pass through the intersection ahead of the adjacent vehicle.

According to the first and second aspects of the present disclosure, the driver's discomfort with the deceleration assistance can be reduced when turning right or left at the intersection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14A is a flowchart illustrating an example of a visibility impairment situation determination process;

FIG. 14B is a flowchart illustrating an example of a crosswalk determination process;

FIG. 14C is a flowchart illustrating an example of an obstacle determination process;

FIG. 15A is a flowchart illustrating an example of an accelerator release determination process; and FIG. 15B is a flowchart illustrating an example of a turn signal operation timing determination process.

DETAILED DESCRIPTION OF EMBODIMENTS

Embodiments of the present disclosure will be described below with reference to the drawings.

First Embodiment

Figure 1:
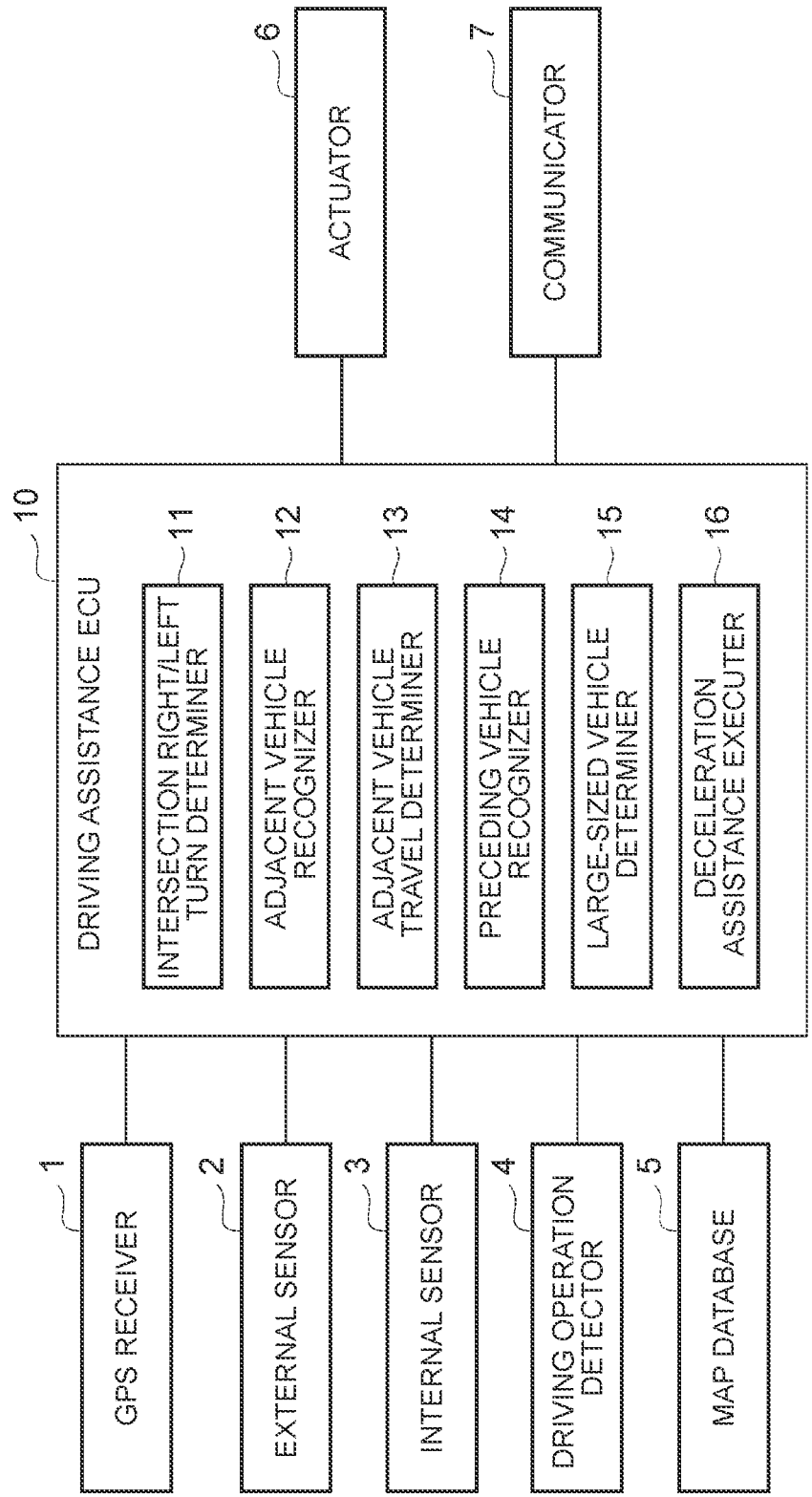
FIG. 1 is a block diagram illustrating a driving assistance device according to a first embodiment.

A driving assistance device 100 illustrated in FIG. 1 is mounted on a vehicle (driver's vehicle) such as a passenger car and assists a driver in driving the driver's vehicle. The driving assistance device 100 assists deceleration of the driver's vehicle when the driver's vehicle turns right or left at an intersection. The deceleration assistance is driving assistance for decelerating the driver's vehicle depending on situations.

Configuration of Driving Assistance Device of First Embodiment

The configuration of the driving assistance device 100 will be described below with reference to the drawings. As illustrated in FIG. 1, the driving assistance device 100 includes a driving assistance electronic control unit (ECU) 10 that centrally manages the device. The driving assistance ECU 10 is an electronic control unit that includes a central processing unit (CPU), a read only memory (ROM), a random access memory (RAM), and the like. For example, the driving assistance ECU 10 implements various functions by the CPU executing programs stored in the ROM. The driving assistance ECU 10 may be constituted by a plurality of electronic units.

The driving assistance ECU 10 is connected to a global positioning system (GPS) receiver 1, an external sensor 2, an internal sensor 3, a driving operation detector (driving operation detection unit) 4, a map database 5, and an actuator 6.

The GPS receiver 1 measures the position of the driver's vehicle (for example, the latitude and longitude of the driver's vehicle) by receiving signals from three or more GPS satellites. The GPS receiver 1 transmits information on the measured position of the driver's vehicle to the ECU 10. A global navigation satellite system (GNSS) receiver may be used instead of the GPS receiver 1.

The external sensor 2 is a detection device that detects a situation around the driver's vehicle. The external sensor 2 includes at least one of an external camera and a radar sensor. The external camera is an imaging device that images a situation outside the driver's vehicle. For example, the external camera is provided on a back side of a windshield of the driver's vehicle, and images a view ahead of the driver's vehicle. The external camera transmits imaging information related to the situation outside the driver's vehicle to the driving assistance ECU 10. The external camera may be a monocular camera or a stereo camera.

A radar sensor is a detection device that detects an object around the driver's vehicle by using radio waves (for example, millimeter waves) or light. Examples of the radar sensor include a millimeter-wave radar and a light detection and ranging (LIDAR) sensor. The radar sensor detects an object by transmitting radio waves or light to the surroundings of the driver's vehicle and receiving the radio waves or light reflected by the object. The radar sensor transmits information on the detected object to the driving assistance ECU 10.

The internal sensor 3 is a detection device that detects traveling conditions of the driver's vehicle. The internal sensor 3 includes a vehicle speed sensor, an acceleration sensor, and a yaw rate sensor. The vehicle speed sensor is a detector that detects the speed of the driver's vehicle. Examples of the vehicle speed sensor include a wheel speed sensor that is provided on each wheel of the driver's vehicle or a drive shaft that rotates together with the wheel and detects a rotation speed of the wheel. The vehicle speed sensor transmits information on the detected vehicle speed (wheel speed) to the driving assistance ECU 10.

The acceleration sensor is a detector that detects the acceleration of the driver's vehicle. The acceleration sensor includes, for example, a longitudinal acceleration sensor that detects an acceleration of the driver's vehicle in a fore-and-aft direction, and a lateral acceleration sensor that detects a lateral acceleration of the driver's vehicle. For example, the acceleration sensor transmits information on the acceleration of the driver's vehicle to the driving assistance ECU 10. The yaw rate sensor is a detector that detects a yaw rate (rotational angular velocity) about a vertical axis of the center of gravity of the driver's vehicle. Examples of the yaw rate sensor include a gyro sensor. The yaw rate sensor transmits information on the detected yaw rate of the driver's vehicle to the driving assistance ECU 10.

The driving operation detector 4 is a detection device that detects a driving operation on the driver's vehicle by the driver. The driving operation detector 4 includes an accelerator pedal sensor or a turn signal sensor. The driving operation detector 4 may include both the accelerator pedal sensor and the turn signal sensor, or include a steering sensor, a brake pedal sensor, or a shift lever sensor.

The accelerator pedal sensor is provided, for example, on a shaft of an accelerator pedal, and detects a force or amount of depression of the accelerator pedal by the driver (position of the accelerator pedal). The turn signal sensor detects an operation (ON/OFF operation) on a turn signal by the driver. The turn signal sensor can be provided, for example, on an operating lever of the turn signal.

The brake pedal sensor is provided, for example, on a shaft of a brake pedal, and detects a force or amount of depression of the brake pedal by the driver (position of the brake pedal). The steering sensor is provided, for example, on a steering shaft of the driver's vehicle, and detects a steering torque given to a steering wheel by the driver. The shift lever sensor detects a shift position of a transmission.

The map database 5 stores map information. The map database 5 is constructed in a storage device such as a hard disk drive (HDD) mounted on the driver's vehicle. The map information may include road position information, road shape information (for example, curves, types of straight portions, and curvatures of curves), position information of intersections and branch points, position information of structures, and the like. The map information may include information on traffic regulations such as legal speeds associated with position information. The map database 5 may be constructed in a server that can communicate with the driver's vehicle.

The actuator 6 is a device that is used to control the driver's vehicle. The actuator 6 includes at least a drive actuator and a brake actuator. The actuator 6 may include a steering actuator. The drive actuator controls a drive force of the driver's vehicle by controlling the amount of air to be supplied to an engine (throttle valve opening degree) in response to a control signal from the driving assistance ECU 10. When the driver's vehicle is a hybrid electric vehicle, the drive force is controlled by inputting a control signal from the driving assistance ECU 10 to a motor serving as a power source, in addition to the amount of air to be supplied to the engine. When the driver's vehicle is a battery electric vehicle, the drive force is controlled by inputting a control signal from the driving assistance ECU 10 to a motor serving as a power source. In such cases, the motor serving as the power source constitutes the actuator 6.

The brake actuator controls a braking force to be applied to the wheels of the driver's vehicle by controlling a brake system in response to a control signal from the driving assistance ECU 10. Examples of the brake system include a hydraulic brake system. The steering actuator controls drive of an assist motor that controls a steering torque in an electric power steering system in response to a control signal from the driving assistance ECU 10. Thus, the steering actuator controls the steering torque of the driver's vehicle.

A communicator 7 acquires various types of information via a communication network (for example, the Internet or Vehicle Information and Communication System (VICS) (registered trademark)). The communicator 7 acquires traffic-related information by communicating with a computer of a facility such as an information management center that manages traffic information. The traffic-related information includes information on construction sections on roads, information on accidents on roads, information on road conditions due to snow, and the like. The communicator 7 may acquire road information by road-to-vehicle communication with a road-side transceiver (for example, an optical beacon or an intelligent transport systems (ITS) spot) provided on a roadside. The communicator 7 may have a vehicle-to-vehicle communication function.

Next, the functional configuration of the driving assistance ECU 10 will be described. As illustrated in FIG. 1, the driving assistance ECU 10 includes an intersection right/left turn determiner 11, an adjacent vehicle recognizer (adjacent vehicle recognition unit) 12, an adjacent vehicle travel determiner (adjacent vehicle travel determination unit) 13, a preceding vehicle recognizer (preceding vehicle recognition unit) 14, a large-sized vehicle determiner (large-sized vehicle determination unit) 15, and a deceleration assistance executer (deceleration assistance execution unit) 16. The functions of the driving assistance ECU 10 described below may partially be executed in a server communicable with the driver's vehicle.

The intersection right/left turn determiner 11 recognizes (detects) an intersection ahead of the driver's vehicle. The intersection right/left turn determiner 11 recognizes the intersection ahead of the driver's vehicle based on, for example, position information of the driver's vehicle measured by the GPS receiver 1 and map information in the map database 5.

The intersection right/left turn determiner 11 may recognize the position of the driver's vehicle by a simultaneous localization and mapping (SLAM) technology using not only the position information of the driver's vehicle measured by the GPS receiver 1 but also position information of structures (landmarks) such as electric poles in the map information in the map database 5 and results of detection of the structures by the external sensor 2. The intersection right/left turn determiner 11 may recognize the intersection ahead of the driver's vehicle by acquiring position information of the intersection from the communication network via the communicator 7.

When the intersection ahead of the driver's vehicle is recognized, the intersection right/left turn determiner 11 determines whether the driver's vehicle turns right or left at the intersection. The intersection right/left turn determiner 11 determines whether the driver's vehicle turns right or left at the intersection based on a driving operation of the driver that is detected by the driving operation detector 4. The driving operation includes, for example, an operation on the turn signal (ON/OFF operation). The driving operation may include steering by the driver, accelerator release that is release of the accelerator pedal by the driver, a braking operation that is depression of the brake pedal by the driver, or a shift-down operation.

The intersection right/left turn determiner 11 may determine that the driver's vehicle turns right or left at the intersection when the driver's vehicle is moving to the right or left as approaching the intersection by the driver's steering. The intersection right/left turn determiner 11 may determine that the driver's vehicle turns right or left at the intersection based on the accelerator release, the braking operation, or the shift-down operation when the driver's vehicle is moving to the right or left of the lane as approaching the intersection. The intersection right/left turn determiner 11 recognizes which of a right turn and a left turn is made at the intersection based on an operation on the turn signal or driver's steering.

The adjacent vehicle recognizer 12 recognizes an adjacent vehicle traveling in an adjacent lane that is adjacent to the traveling lane of the driver's vehicle based on a detection result from the external sensor 2. For example, the adjacent vehicle recognizer 12 recognizes, as the adjacent vehicle, another vehicle traveling in the same direction as that of the driver's vehicle on the side of the driver's vehicle within an adjacent vehicle recognition range preset with respect to the driver's vehicle.

The adjacent vehicle recognition range is set as, for example, a rectangular range with respect to the center of the front end of the driver's vehicle. The adjacent vehicle recognition range can be set to a range of a predetermined lateral distance and a predetermined fore-and-aft distance with respect to the center of the front end of the driver's vehicle. The adjacent vehicle recognition range need not be the rectangular range, but may be a range having an elliptical or other shape. The adjacent vehicle recognition range may be set with respect to the center of the driver's vehicle in plan view or any position in the driver's vehicle.

The adjacent vehicle recognizer 12 may determine the adjacent lane that is adjacent to the traveling lane of the driver's vehicle by using the position information of the driver's vehicle and the map information. The adjacent vehicle recognizer 12 combines the detection results from the external sensor 2 to recognize another vehicle traveling in the adjacent lane as the adjacent vehicle.

Figure 2:
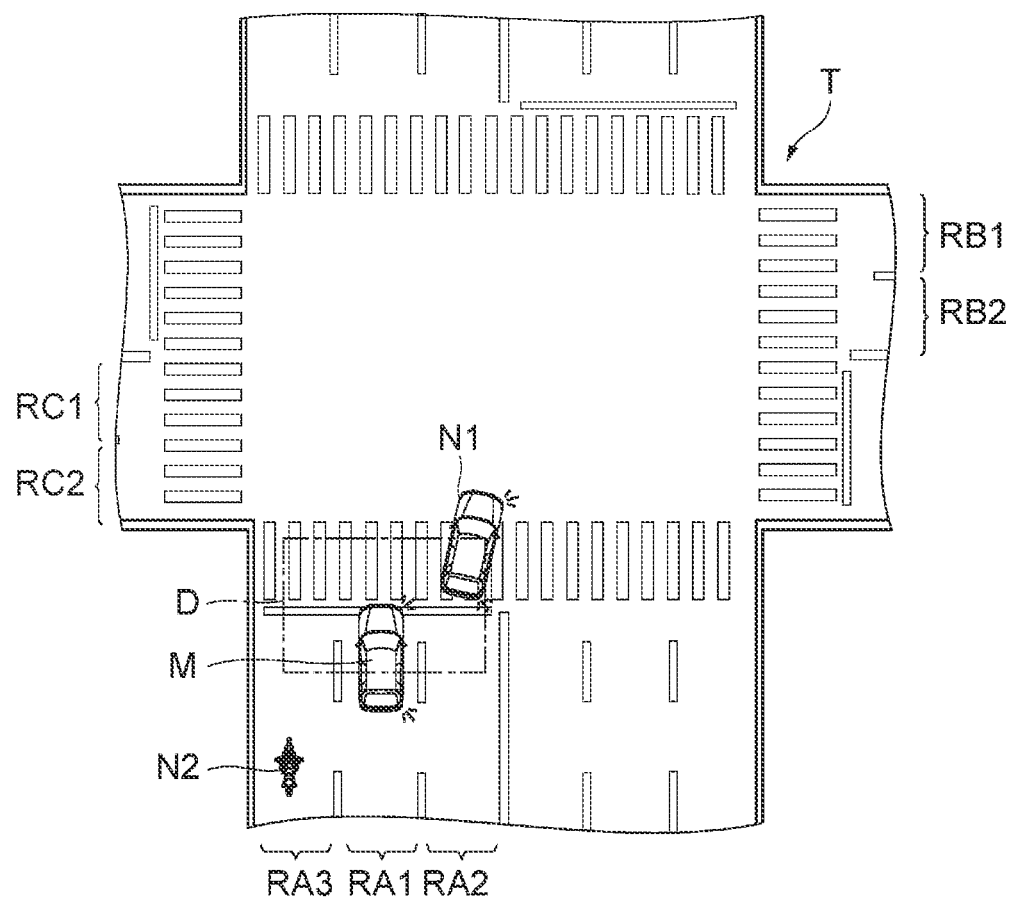
FIG. 2 is a plan view illustrating recognition of an adjacent vehicle.

FIG. 2 is a plan view illustrating recognition of the adjacent vehicle. An intersection T illustrated in FIG. 2 is an intersection where a road having three lanes RA1 to RA3 on one side and a road having two lanes RB1 and RB2 on one side intersect each other. The remaining lanes on the road having two lanes on one side are represented by RC1 and RC2.

FIG. 2 illustrates a driver's vehicle M, another vehicle N1, and another vehicle (two-wheeled vehicle) N2. The driver's vehicle M is traveling in the middle lane RA1 (traveling lane RA1) among the three lanes. The other vehicle N1 is a four-wheeled vehicle traveling slightly ahead of the driver's vehicle M in the lane RA2 (adjacent lane RA2) adjacent to a right side of the lane RA1. The other vehicle N2 is a two-wheeled vehicle traveling behind the driver's vehicle M in the lane RA3 (adjacent lane RA3) adjacent to a left side of the lane RA1. FIG. 2 also illustrates an adjacent vehicle recognition range D of the driver's vehicle M.

In the situation illustrated in FIG. 2, the adjacent vehicle recognizer 12 recognizes, as the adjacent vehicle, the other vehicle N1 traveling in the lane RA2 and partially included in the adjacent vehicle recognition range D of the driver's vehicle M. The adjacent vehicle recognizer 12 does not recognize, as the adjacent vehicle, the other vehicle N2 that is not included in the adjacent vehicle recognition range D. The adjacent vehicle recognizer 12 need not recognize the adjacent vehicle by using the adjacent vehicle recognition range. Various methods can be adopted for recognizing the adjacent vehicle.

The adjacent vehicle travel determiner 13 determines whether the adjacent vehicle turns in the same direction as that of the driver's vehicle at the intersection when the adjacent vehicle is recognized by the adjacent vehicle recognizer 12 and the driver's vehicle turns right or left at the intersection. The adjacent vehicle travel determiner 13 determines whether the adjacent vehicle turns in the same direction as that of the driver's vehicle based on adjacent vehicle information acquired by the vehicle-to-vehicle communication with the adjacent vehicle or a detection result from the external sensor 2.

The adjacent vehicle information is information related to the adjacent vehicle that is obtained by the vehicle-to-vehicle communication. The adjacent vehicle information includes at least one of steering by a driver of the adjacent vehicle, a yaw rate of the adjacent vehicle, a lighting status of a turn signal, and navigation information (information related to a traveling route being guided by a navigation system). The adjacent vehicle travel determiner 13 determines whether the adjacent vehicle turns in the same direction as that of the driver's vehicle based on the adjacent vehicle information indicating, for example, the lighting status of the turn signal of the adjacent vehicle.

The adjacent vehicle travel determiner 13 may determine whether the adjacent vehicle turns in the same direction as that of the driver's vehicle based on a detection result from the external sensor 2. The adjacent vehicle travel determiner 13 may determine whether the adjacent vehicle turns in the same direction as that of the driver's vehicle by recognizing, for example, the lighting of the turn signal of the adjacent vehicle from an image captured by the external camera. The adjacent vehicle travel determiner 13 may determine whether the adjacent vehicle turns in the same direction as that of the driver's vehicle based on a change in the direction or position of the adjacent vehicle that is detected by the radar sensor.

In the situation illustrated in FIG. 2, the adjacent vehicle travel determiner 13 determines that the adjacent vehicle N1 turns in the same direction as that of the driver's vehicle M (rightward direction) by recognizing, for example, the lighting of a right turn signal of the adjacent vehicle N1 from an image captured by the external camera of the driver's vehicle M. In the situation illustrated in FIG. 2, the driver's vehicle M is expected to turn right from the lane RA1 to the lane RB1, and the adjacent vehicle N1 is expected to turn right from the lane RA2 to the lane RB2.

The preceding vehicle recognizer 14 recognizes a preceding vehicle traveling ahead of the driver's vehicle based on a detection result from the external sensor 2. The preceding vehicle recognizer 14 recognizes the preceding vehicle by an image recognition process, for example, from an image captured by the external camera and showing a view ahead of the driver's vehicle. The preceding vehicle recognizer 14 may recognize the preceding vehicle located ahead of the driver's vehicle based on a detection result from the radar sensor. The preceding vehicle recognizer 14 recognizes a vehicle-to-vehicle distance between the driver's vehicle and the preceding vehicle from the image captured by the external camera and showing the view ahead of the driver's vehicle or the detection result from the radar sensor.

Figure 3:
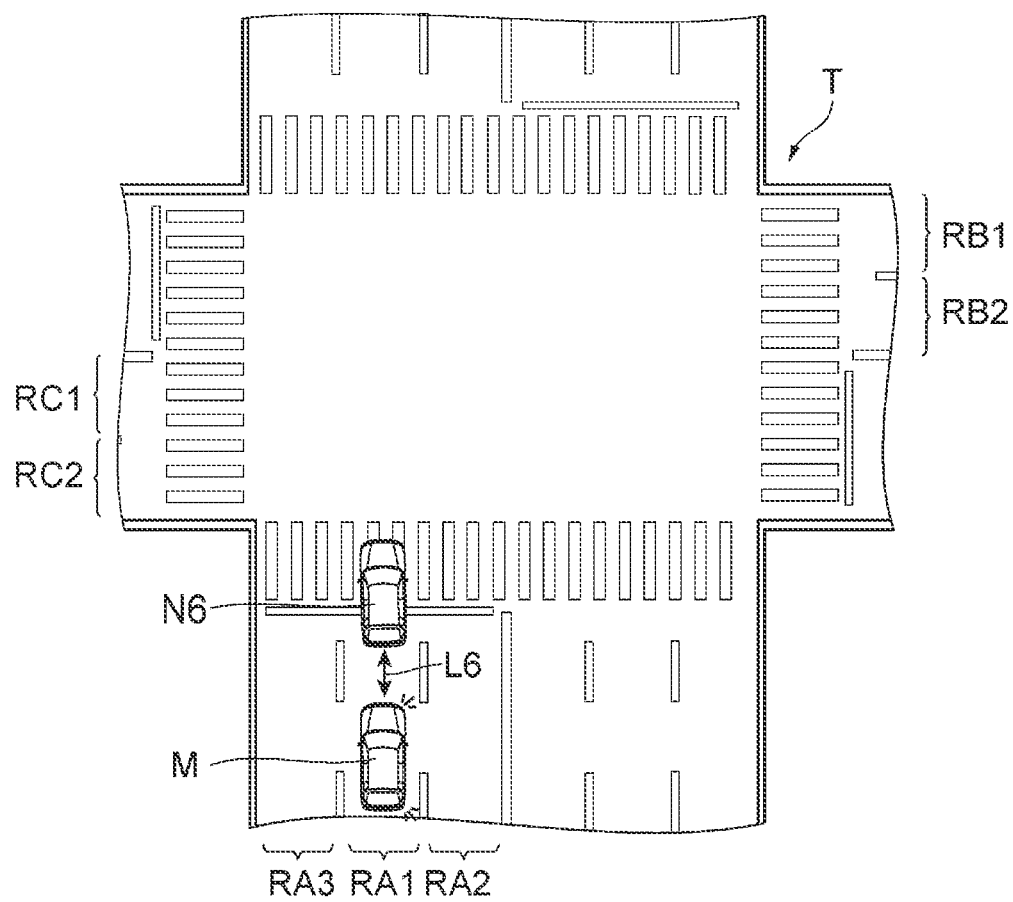
FIG. 3 is a plan view illustrating an example of a situation in which a driver's vehicle recognizes a preceding vehicle.

FIG. 3 is a plan view illustrating an example of a situation in which the preceding vehicle is recognized. FIG. 3 illustrates a preceding vehicle N6 traveling in the same lane RA1 (traveling lane RA1) as that of the driver's vehicle M, and a vehicle-to-vehicle distance L6 between the driver's vehicle M and the preceding vehicle N6. In the situation illustrated in FIG. 3, the preceding vehicle recognizer 14 recognizes the preceding vehicle N6 and the vehicle-to-vehicle distance L6 between the driver's vehicle M and the preceding vehicle N6 based on a detection result from the external sensor 2.

When the preceding vehicle is recognized by the preceding vehicle recognizer 14, the large-sized vehicle determiner 15 determines whether the preceding vehicle is a large-sized vehicle based on preceding vehicle information acquired by vehicle-to-vehicle communication with the preceding vehicle or the detection result from the external sensor 2. The large-sized vehicle is a vehicle such as a large-sized truck. The large-sized vehicle may be defined by types of vehicle according to laws and regulations, or may be defined by size.

The preceding vehicle information is information related to the preceding vehicle that is obtained by the vehicle-to-vehicle communication. It is assumed that the preceding vehicle information includes at least one of information related to the type of vehicle such as a large-sized vehicle and information related to the size of the vehicle. The large-sized vehicle determiner 15 determines that the preceding vehicle is a large-sized vehicle, for example, by recognizing the type of the vehicle based on the preceding vehicle information.

The large-sized vehicle determiner 15 may recognize the type of the vehicle and determine that the preceding vehicle is a large-sized vehicle by detecting information on a license plate of the preceding vehicle from an image captured by the external camera. The large-sized vehicle determiner 15 may estimate the area of the back surface of the preceding vehicle based on the image captured by the external camera or the detection result from the radar sensor, and determine that the preceding vehicle is a large-sized vehicle when the area of the back surface is equal to or larger than a predetermined threshold. The large-sized vehicle determiner 15 may determine that the preceding vehicle is a large-sized vehicle when the width of the preceding vehicle is equal to or larger than a predetermined threshold or the height of the preceding vehicle is equal to or larger than a predetermined threshold, instead of the area of the back surface. The large-sized vehicle determiner 15 may determine that the preceding vehicle is a large-sized vehicle by machine learning from the image captured by the external camera or the detection result from the radar sensor.

Figure 4:
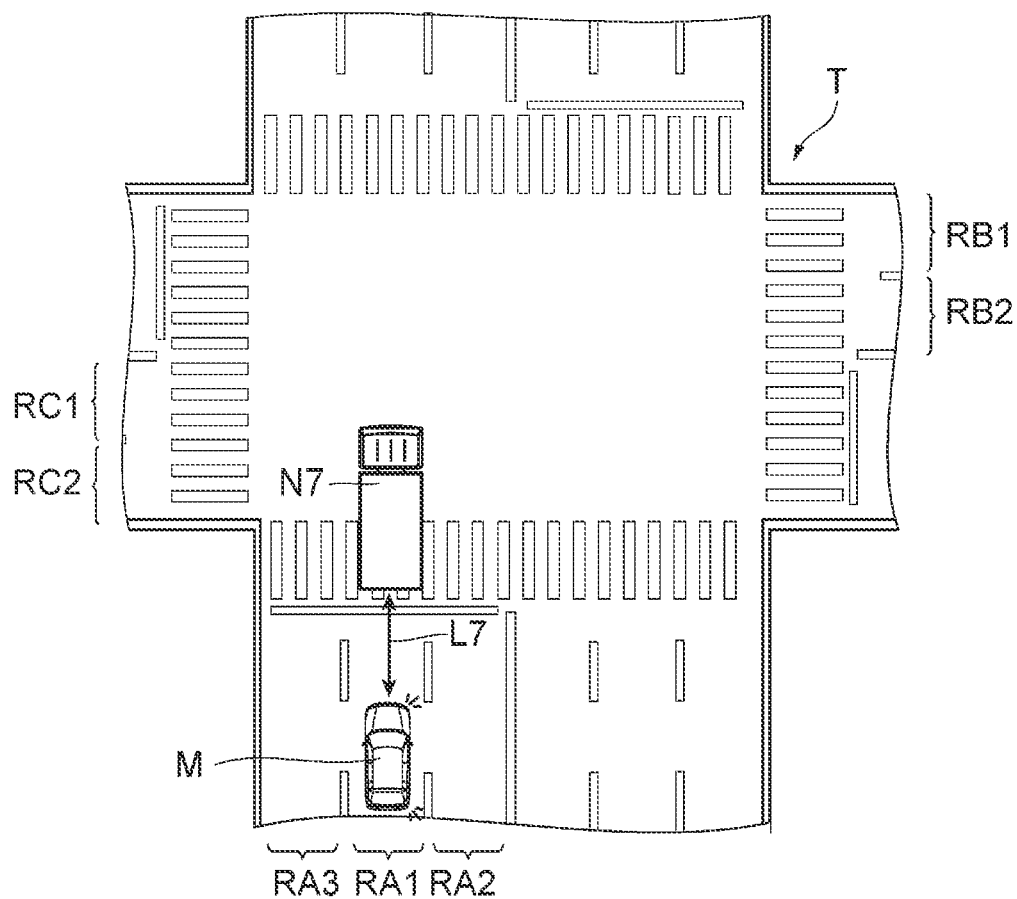
FIG. 4 is a plan view illustrating an example of a case where the preceding vehicle is a large-sized vehicle.

FIG. 4 is a plan view illustrating an example of a case where the preceding vehicle is a large-sized vehicle. FIG. 4 illustrates a large-sized vehicle N7 traveling in the same lane RA1 as that of the driver's vehicle M, and a vehicle-to-vehicle distance L7 between the driver's vehicle M and the large-sized vehicle N7. In the situation illustrated in FIG. 4, the large-sized vehicle determiner 15 recognizes the type of the vehicle and determines that the preceding vehicle is a large-sized vehicle, for example, by detecting information on a license plate of the preceding vehicle from an image captured by the external camera.

The deceleration assistance executer 16 assists deceleration of the driver's vehicle when the intersection right/left turn determiner 11 determines that the driver's vehicle turns right or left at the intersection. The deceleration assistance executer 16 transmits a control signal to the actuator 6 and drives the brake actuator or the like to realize the deceleration assistance. For example, the deceleration assistance executer 16 assists the deceleration to cause the vehicle speed of the driver's vehicle to reach a target vehicle speed. As the target vehicle speed, a preset value may be adopted depending on a situation of the right or left turn at the intersection, or the value may be changed depending on the vehicle-to-vehicle distance between the driver's vehicle and the preceding vehicle. The deceleration assistance executer 16 can change details of the deceleration assistance by adjusting each parameter such as a target deceleration, a target jerk, and a deceleration assistance start timing in addition to the target vehicle speed.

The deceleration assistance executer 16 changes the details of the deceleration assistance depending on various situations such as the presence or absence of other vehicles in the vicinity. First, the change of the details of the deceleration assistance depending on the adjacent vehicle will be described.

Specifically, when determination is made that the driver's vehicle turns right or left at the intersection and the adjacent vehicle travel determiner 13 determines that the adjacent vehicle turns in the same direction as that of the driver's vehicle, the deceleration assistance executer 16 assists the deceleration to cause the vehicle-to-vehicle distance between the driver's vehicle and the adjacent vehicle in the traveling direction of the driver's vehicle to reach a distance equal to or larger than a target driver's vehicle-to-adjacent vehicle distance. The deceleration assistance executer 16 assists the deceleration to cause the vehicle-to-vehicle distance between the driver's vehicle and the adjacent vehicle to reach a distance equal to or larger than the target driver's vehicle-to-adjacent vehicle distance by using the position and the vehicle speed of the adjacent vehicle that are acquired based on the detection result from the external sensor 2. The position of the adjacent vehicle may be a relative position of the adjacent vehicle to the driver's vehicle. The vehicle speed of the adjacent vehicle may be a relative vehicle speed of the adjacent vehicle to the driver's vehicle.

The vehicle-to-vehicle distance between the driver's vehicle and the adjacent vehicle in the traveling direction of the driver's vehicle is, for example, a vehicle-to-vehicle distance between the driver's vehicle and the adjacent vehicle projected onto the traveling route of the driver's vehicle during the right or left turn at the intersection. The vehicle-to-vehicle distance between the driver's vehicle and the adjacent vehicle in the traveling direction of the driver's vehicle may be a vehicle-to-vehicle distance between the driver's vehicle and the adjacent vehicle projected onto a longitudinal axis of the driver's vehicle with respect to the driver's vehicle.

The target driver's vehicle-to-adjacent vehicle distance is a target vehicle-to-vehicle distance set so that the driver of the driver's vehicle does not have discomfort with the deceleration assistance in relation to the adjacent vehicle when the adjacent vehicle turns in the same direction as that of the driver's vehicle at the intersection. The target driver's vehicle-to-adjacent vehicle distance may be a preset value.

The target driver's vehicle-to-adjacent vehicle distance may be different values depending on whether the driver's vehicle turns ahead of the adjacent vehicle at the intersection or the adjacent vehicle turns ahead of the driver's vehicle at the intersection. The target driver's vehicle-to-adjacent vehicle distance may be different values depending on whether the driver's vehicle turns right or left. The target driver's vehicle-to-adjacent vehicle distance may be different values depending on whether the driver's vehicle turns outside or inside the adjacent vehicle. The target driver's vehicle-to-adjacent vehicle distance may be set to different values depending on the vehicle speed of the driver's vehicle and the vehicle speed of the adjacent vehicle.

The deceleration assistance executer 16 may assist the deceleration to cause the vehicle-to-vehicle distance between the preceding adjacent vehicle and the driver's vehicle to reach a distance equal to or larger than the target driver's vehicle-to-adjacent vehicle distance, or cause the vehicle-to-vehicle distance between the preceding driver's vehicle and the adjacent vehicle to reach a distance equal to or larger than the target driver's vehicle-to-adjacent vehicle distance. It is only necessary to appropriately secure the vehicle-to-vehicle distance between the driver's vehicle and the adjacent vehicle. The fore-and-aft relationship between the driver's vehicle and the adjacent vehicle is not limited.

Figure 5:
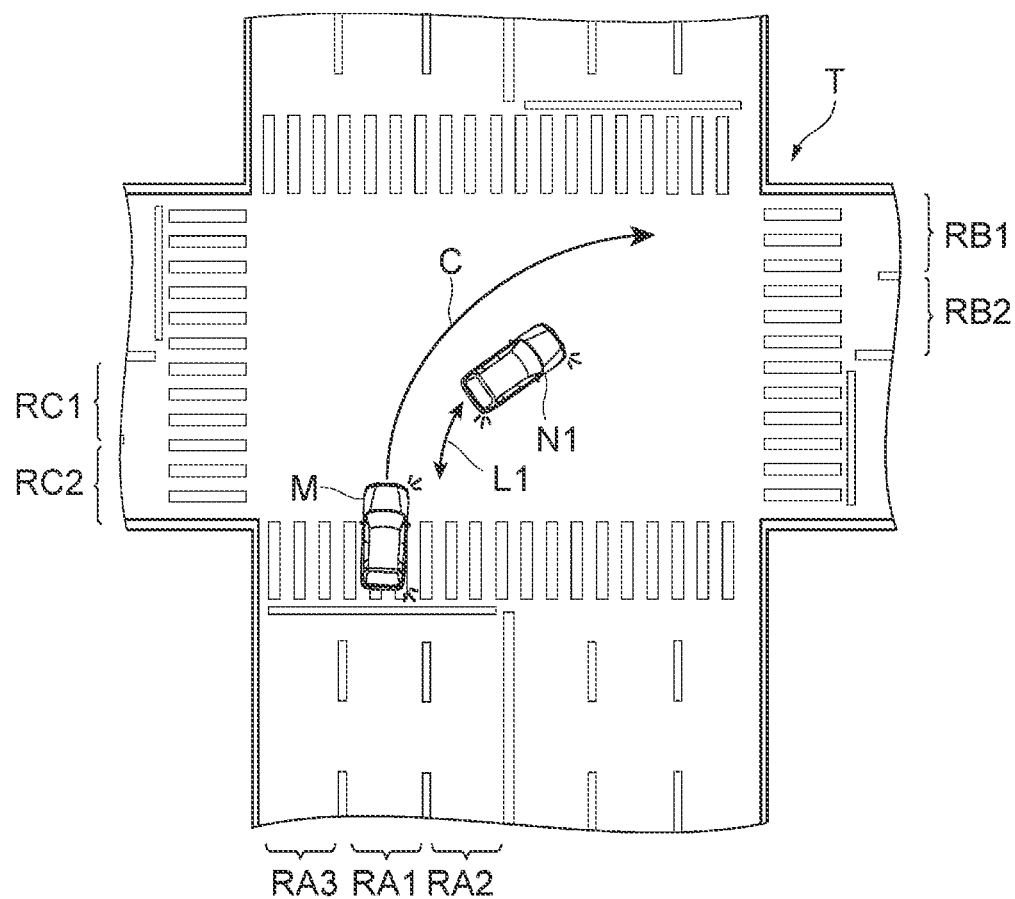
FIG. 5 is a plan view illustrating an example of a situation in which the adjacent vehicle turns in the same direction as that of the driver's vehicle.

FIG. 5 is a plan view illustrating an example of a situation in which the adjacent vehicle turns in the same direction as that of the driver's vehicle. In FIG. 5, the driver's vehicle M and the adjacent vehicle N1 are about to turn right at the intersection T and advance to the lanes RB1 and RB2, respectively. FIG. 5 illustrates a traveling route C of the driver's vehicle M and a vehicle-to-vehicle distance L1 between the driver's vehicle M and the adjacent vehicle N1 in the traveling direction of the driver's vehicle M. The vehicle-to-vehicle distance L1 between the driver's vehicle M and the adjacent vehicle N1 in the traveling direction of the driver's vehicle M is, for example, a vehicle-to-vehicle distance between the driver's vehicle M and the adjacent vehicle N1 projected onto the traveling route C of the driver's vehicle M (vehicle-to-vehicle distance along the traveling route C of the driver's vehicle M).

In the situation illustrated in FIG. 5, determination is made that the driver's vehicle M turns right at the intersection T, and the adjacent vehicle travel determiner 13 determines that the adjacent vehicle N1 turns in the same direction as that of the driver's vehicle M. Therefore, the deceleration assistance executer 16 assists the deceleration to cause the vehicle-to-vehicle distance L1 between the driver's vehicle M and the adjacent vehicle N1 in the traveling direction of the driver's vehicle M to reach a distance equal to or larger than the target driver's vehicle-to-adjacent vehicle distance.

Figure 6:
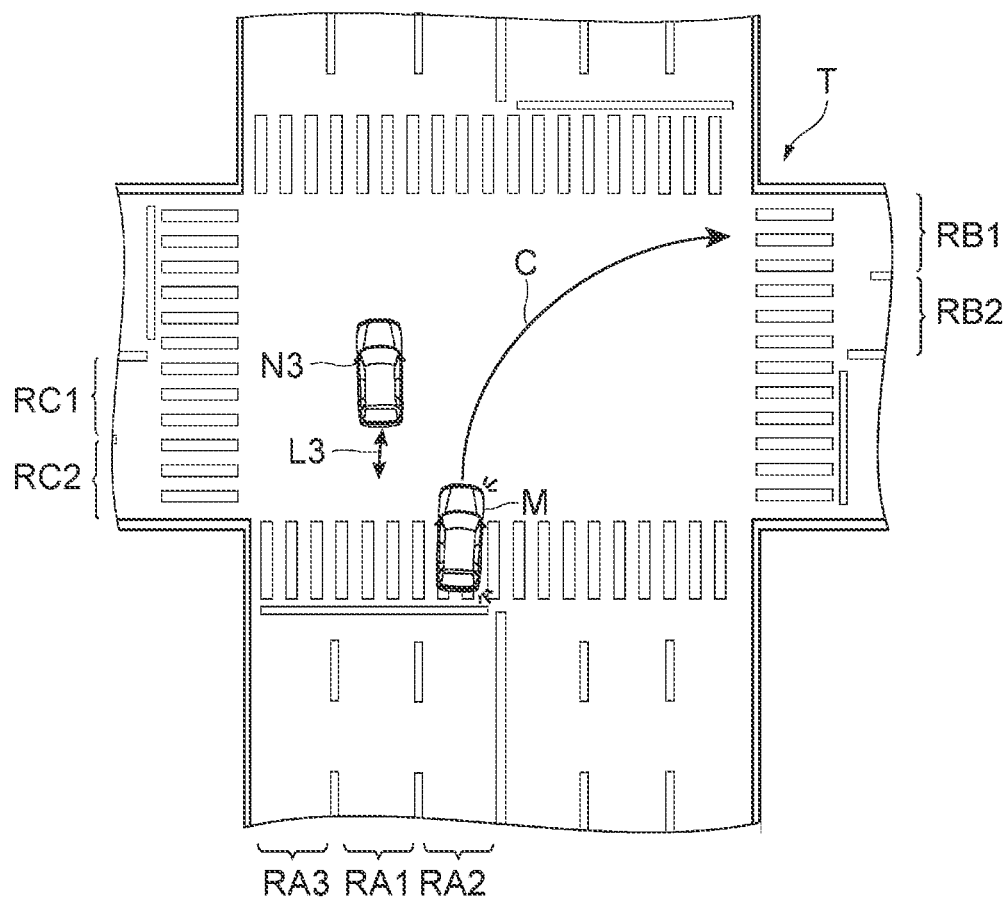
FIG. 6 is a plan view illustrating an example of a situation in which the adjacent vehicle travels in a direction different from that of the driver's vehicle.

FIG. 6 is a plan view illustrating an example of a situation in which the adjacent vehicle travels in a direction different from that of the driver's vehicle. FIG. 6 illustrates an adjacent vehicle N3 traveling straight through the intersection T, and a vehicle-to-vehicle distance L3 between the driver's vehicle M and the adjacent vehicle N3 in the traveling direction of the driver's vehicle M. In the situation illustrated in FIG. 6, the adjacent vehicle N3 does not turn in the same direction as that of the driver's vehicle M. Therefore, the deceleration assistance executer 16 need not assist the deceleration to cause the vehicle-to-vehicle distance L3 from the adjacent vehicle N3 to reach a distance equal to or larger than the target driver's vehicle-to-adjacent vehicle distance. The deceleration assistance executer 16 may assist the deceleration caused by the right or left turn of the driver's vehicle M.

Next, the change of the details of the deceleration assistance depending on the preceding vehicle will be described. When determination is made that the driver's vehicle turns right or left at the intersection and the preceding vehicle recognizer 14 recognizes a preceding vehicle traveling ahead of the driver's vehicle, the deceleration assistance executer 16 assists the deceleration to cause a vehicle-to-vehicle distance between the driver's vehicle and the preceding vehicle to reach a distance equal to or larger than a target driver's vehicle-to-preceding vehicle distance.

The target driver's vehicle-to-preceding vehicle distance is a target vehicle-to-vehicle distance set so that the driver of the driver's vehicle does not have discomfort in relation to the preceding vehicle. The target driver's vehicle-to-preceding vehicle distance includes a target driver's vehicle-to-preceding vehicle distance for an ordinary-sized vehicle and a target driver's vehicle-to-preceding vehicle distance for a large-sized vehicle as described later. The target driver's vehicle-to-preceding vehicle distance for a large-sized vehicle is a target vehicle-to-vehicle distance larger than the target driver's vehicle-to-preceding vehicle distance for an ordinary-sized vehicle.

When the large-sized vehicle determiner 15 determines that the preceding vehicle is a large-sized vehicle, the deceleration assistance executer 16 assists the deceleration to increase the vehicle-to-vehicle distance between the driver's vehicle and the preceding vehicle in the traveling direction of the driver's vehicle as compared with a case where determination is not made that the preceding vehicle is a large-sized vehicle.

Specifically, the deceleration assistance executer 16 assists the deceleration to cause the vehicle-to-vehicle distance between the driver's vehicle and the preceding vehicle to reach a distance equal to or larger than the target driver's vehicle-to-preceding vehicle distance for an ordinary-sized vehicle (see FIG. 3). When the large-sized vehicle determiner 15 determines that the preceding vehicle is a large-sized vehicle, the deceleration assistance executer 16 assists the deceleration to cause the vehicle-to-vehicle distance between the driver's vehicle and the preceding vehicle to reach a distance equal to or larger than the target driver's vehicle-to-preceding vehicle distance for a large-sized vehicle (see FIG. 4).

Control of Driving Assistance Device of First Embodiment

Figure 7:
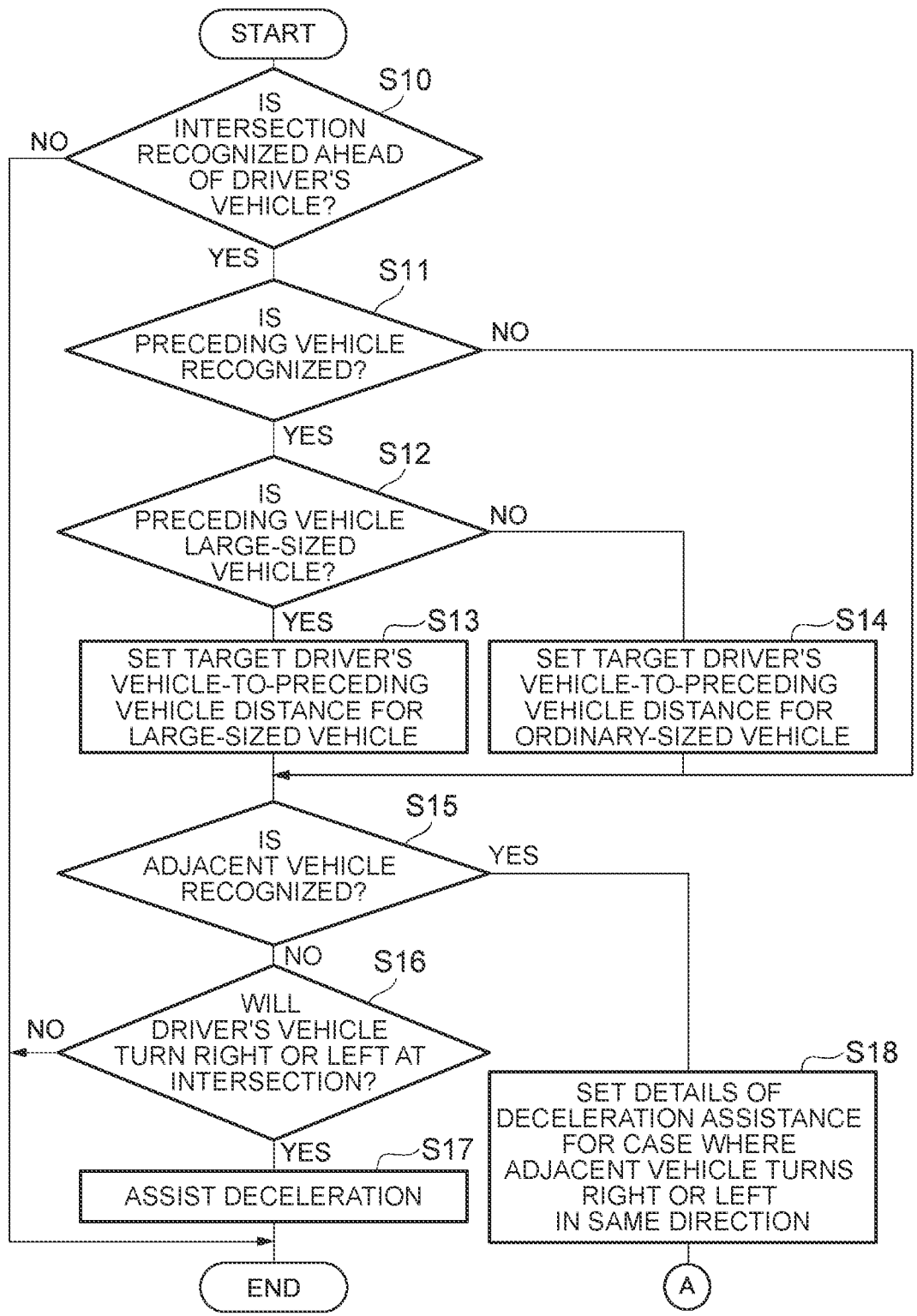
FIG. 7 is a flowchart illustrating an example of a deceleration assistance execution process.
Figure 8:
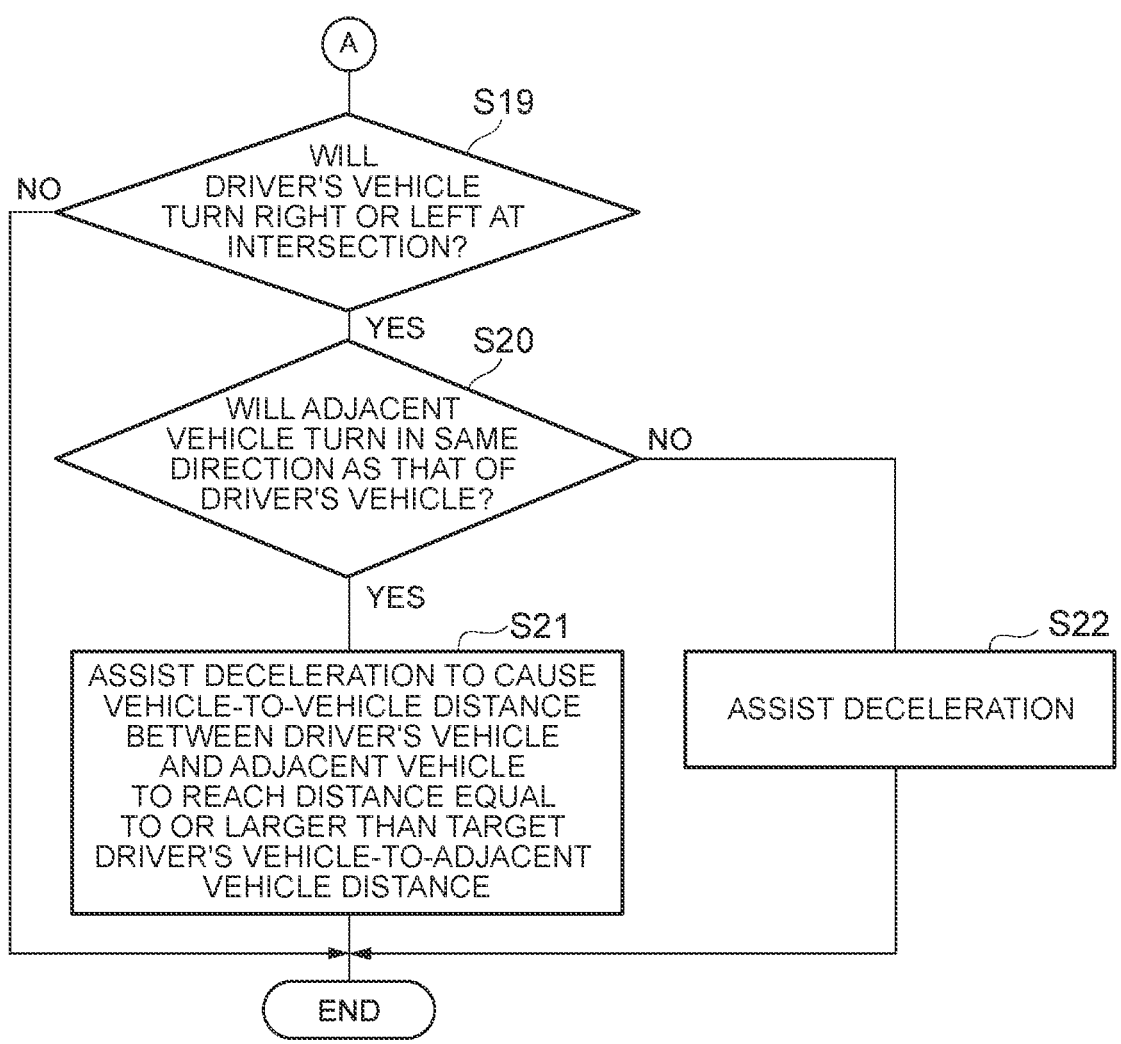
FIG. 8 is a flowchart illustrating continuation of the deceleration assistance execution process.

Next, control (processes) of the driving assistance device 100 according to the first embodiment will be described with reference to the drawings. FIG. 7 is a flowchart illustrating an example of a deceleration assistance execution process. FIG. 8 is a flowchart illustrating continuation of the deceleration assistance execution process. The deceleration assistance execution process illustrated in FIGS. 7 and 8 is executed, for example, when the driving assistance of the driver's vehicle is ON.

As illustrated in FIG. 7, the driving assistance ECU 10 of the driving assistance device 100 causes the intersection right/left turn determiner 11 to recognize an intersection ahead of the driver's vehicle in S10. The intersection right/left turn determiner 11 recognizes the intersection ahead of the driver's vehicle based on, for example, position information of the driver's vehicle measured by the GPS receiver 1 and map information in the map database 5.

In S11, the driving assistance ECU 10 causes the preceding vehicle recognizer 14 to recognize a preceding vehicle ahead of the driver's vehicle. The preceding vehicle recognizer 14 recognizes a preceding vehicle traveling ahead of the driver's vehicle based on a detection result from the external sensor 2. When the preceding vehicle is recognized (S11: YES), the driving assistance ECU 10 proceeds to S12. When the preceding vehicle is not recognized (S11: NO), the driving assistance ECU 10 proceeds to S15.

In S12, the driving assistance ECU 10 causes the large-sized vehicle determiner 15 to determine whether the preceding vehicle is a large-sized vehicle. The large-sized vehicle determiner 15 determines whether the preceding vehicle is a large-sized vehicle based on preceding vehicle information acquired by vehicle-to-vehicle communication with the preceding vehicle or the detection result from the external sensor 2. When determination is made that the preceding vehicle is a large-sized vehicle (S12: YES), the driving assistance ECU 10 proceeds to S13. When determination is not made that the preceding vehicle is a large-sized vehicle (S12: NO), the driving assistance ECU 10 proceeds to S14.

In S13, the driving assistance ECU 10 sets the target driver's vehicle-to-preceding vehicle distance for a large-sized vehicle as a target vehicle-to-vehicle distance of the deceleration assistance. Then, the driving assistance ECU 10 proceeds to S15.

In S14, the driving assistance ECU 10 sets the target driver's vehicle-to-preceding vehicle distance for an ordinary-sized vehicle as the target vehicle-to-vehicle distance of the deceleration assistance. The target driver's vehicle-to-preceding vehicle distance for an ordinary-sized vehicle is a target vehicle-to-vehicle distance smaller than the target driver's vehicle-to-preceding vehicle distance for a large-sized vehicle. Then, the driving assistance ECU 10 proceeds to S15.

In S15, the driving assistance ECU 10 causes the adjacent vehicle recognizer 12 to recognize an adjacent vehicle. For example, the adjacent vehicle recognizer 12 recognizes, as the adjacent vehicle, another vehicle traveling in the same direction as that of the driver's vehicle on the side of the driver's vehicle within the adjacent vehicle recognition range preset with respect to the driver's vehicle. When the adjacent vehicle is recognized (S15: YES), the driving assistance ECU 10 proceeds to S18. When the adjacent vehicle is not recognized (S15: NO), the driving assistance ECU 10 proceeds to S16.

In S16, the driving assistance ECU 10 causes the intersection right/left turn determiner 11 to determine whether the driver's vehicle turns right or left at the intersection. The intersection right/left turn determiner 11 determines whether the driver's vehicle turns right or left at the intersection based on a driving operation of the driver that is detected by the driving operation detector 4. The intersection right/left turn determiner 11 recognizes which of the right turn and the left turn is made at the intersection by the driver's vehicle. When determination is made that the driver's vehicle turns right or left at the intersection (S16: YES), the driving assistance ECU 10 proceeds to S17. When determination is not made that the driver's vehicle turns right or left at the intersection (S16: NO), the driving assistance ECU 10 terminates the current deceleration assistance execution process. Then, the driving assistance ECU 10 repeats the process from S10 after a predetermined period has elapsed.

In S17, the driving assistance ECU 10 causes the deceleration assistance executer 16 to assist deceleration. The deceleration assistance executer 16 transmits a control signal to the actuator 6 to assist the deceleration of the driver's vehicle turning right or left at the intersection. When the target driver's vehicle-to-preceding vehicle distance for an ordinary-sized vehicle or the target driver's vehicle-to-preceding vehicle distance for a large-sized vehicle is set, the deceleration assistance executer 16 assists the deceleration to cause the vehicle-to-vehicle distance between the preceding vehicle and the driver's vehicle to reach a distance equal to or larger than the set target driver's vehicle-to-preceding vehicle distance. Then, the driving assistance ECU 10 terminates the current deceleration assistance execution process. The driving assistance ECU 10 repeats the process from S10 after the predetermined period has elapsed.

In S18, the driving assistance ECU 10 causes the deceleration assistance executer 16 to set details of the deceleration assistance for a case where the adjacent vehicle turns right or left in the same direction. The deceleration assistance executer 16 sets the details of the deceleration assistance based on the position and the vehicle speed of the adjacent vehicle that are detected by the external sensor 2 on the assumption that the driver's vehicle turns right or left at the intersection and the adjacent vehicle turns right or left in the same direction as that of the driver's vehicle. The details of the deceleration assistance include the target vehicle speed and the target driver's vehicle-to-adjacent vehicle distance of the deceleration assistance. When the target driver's vehicle-to-preceding vehicle distance for an ordinary-sized vehicle or the target driver's vehicle-to-preceding vehicle distance for a large-sized vehicle is set, the details of the deceleration assistance include the target driver's vehicle-to-preceding vehicle distance for an ordinary-sized vehicle or the target driver's vehicle-to-preceding vehicle distance for a large-sized vehicle.

By presetting the details of the deceleration assistance in this way, the driving assistance ECU 10 can easily start the deceleration assistance immediately after the determination about the right or left turn of the driver's vehicle and the right or left turn of the adjacent vehicle in the same direction. Then, the driving assistance ECU 10 proceeds to S19 illustrated in FIG. 8.

In S19 of FIG. 8, the driving assistance ECU 10 causes the intersection right/left turn determiner 11 to determine whether the driver's vehicle turns right or left at the intersection. The determination process of S19 is the same as that of S16 of FIG. 7. When determination is made that the driver's vehicle turns right or left at the intersection (S19: YES), the driving assistance ECU 10 proceeds to S20. When determination is not made that the driver's vehicle turns right or left at the intersection (S19: NO), the driving assistance ECU 10 terminates the current deceleration assistance execution process. Then, the driving assistance ECU 10 repeats the process from S10 after the predetermined period has elapsed.

In S20, the driving assistance ECU 10 causes the adjacent vehicle travel determiner 13 to determine whether the adjacent vehicle turns in the same direction as that of the driver's vehicle. The adjacent vehicle travel determiner 13 determines whether the adjacent vehicle turns in the same direction as that of the driver's vehicle based on adjacent vehicle information acquired by the vehicle-to-vehicle communication with the adjacent vehicle or a detection result from the external sensor 2. When determination is made that the adjacent vehicle turns in the same direction as that of the driver's vehicle (S20: YES), the driving assistance ECU 10 proceeds to S21. When determination is not made that the adjacent vehicle turns in the same direction as that of the driver's vehicle (S20: NO), the driving assistance ECU 10 proceeds to S22.

In S21, the driving assistance ECU 10 causes the deceleration assistance executer 16 to assist the deceleration to cause the vehicle-to-vehicle distance between the driver's vehicle and the adjacent vehicle in the traveling direction of the driver's vehicle to reach a distance equal to or larger than the target driver's vehicle-to-adjacent vehicle distance. For example, the deceleration assistance executer 16 implements the details of the deceleration assistance preset in S18 to assist the deceleration to cause the vehicle-to-vehicle distance between the driver's vehicle and the adjacent vehicle to reach a distance equal to or larger than the target driver's vehicle-to-adjacent vehicle distance. When the vehicle speed of the adjacent vehicle changes suddenly, the deceleration assistance executer 16 may calculate the details of the deceleration assistance based on, for example, the current vehicle speed of the adjacent vehicle. Then, the driving assistance ECU 10 terminates the current deceleration assistance execution process. The driving assistance ECU 10 repeats the process from S10 after the predetermined period has elapsed.

In S22, the driving assistance ECU 10 causes the deceleration assistance executer 16 to assist the deceleration. When the target driver's vehicle-to-preceding vehicle distance for an ordinary-sized vehicle or the target driver's vehicle-to-preceding vehicle distance for a large-sized vehicle is set, the deceleration is assisted to cause the vehicle-to-vehicle distance between the preceding vehicle and the driver's vehicle to reach a distance equal to or larger than the set target driver's vehicle-to-preceding vehicle distance. Then, the driving assistance ECU 10 terminates the current deceleration assistance execution process. The driving assistance ECU 10 repeats the process from S10 after the predetermined period has elapsed.

The deceleration assistance execution process is not limited to the details described above. For example, the determination of S11 and S12 may be made after determination is made that the driver's vehicle turns right or left at the intersection. The same applies to the determination about the adjacent vehicle in S15. It is not always necessary to preset the details of the deceleration assistance in S18. The details of the deceleration assistance may be determined after determination is made that the adjacent vehicle turns in the same direction as that of the driver's vehicle.

According to the driving assistance device 100 of the first embodiment described above, when determination is made that the adjacent vehicle turns in the same direction as that of the driver's vehicle while the driver's vehicle turns right or left at the intersection, the deceleration is assisted to cause the vehicle-to-vehicle distance between the driver's vehicle and the adjacent vehicle in the traveling direction of the driver's vehicle to reach a distance equal to or larger than the target vehicle-to-vehicle distance. Thus, the driver's discomfort with the deceleration assistance can be reduced as compared with a case where the deceleration is assisted without considering the adjacent vehicle.

According to the driving assistance device 100, when determination is made that the preceding vehicle is a large-sized vehicle while the driver's vehicle turns right or left at the intersection, the deceleration is assisted to increase the vehicle-to-vehicle distance between the driver's vehicle and the preceding vehicle in the traveling direction of the driver's vehicle as compared with the case where determination is not made that the preceding vehicle is a large-sized vehicle. Thus, the driver's discomfort with the deceleration assistance can be reduced as compared with a case where the deceleration is assisted without considering whether the preceding vehicle is a large-sized vehicle.

Second Embodiment

Next, a driving assistance device according to a second embodiment will be described. Components identical or corresponding to those in the first embodiment are represented by the same reference numerals, and redundant description will be omitted.

Configuration of Driving Assistance Device of Second Embodiment

Figure 9:
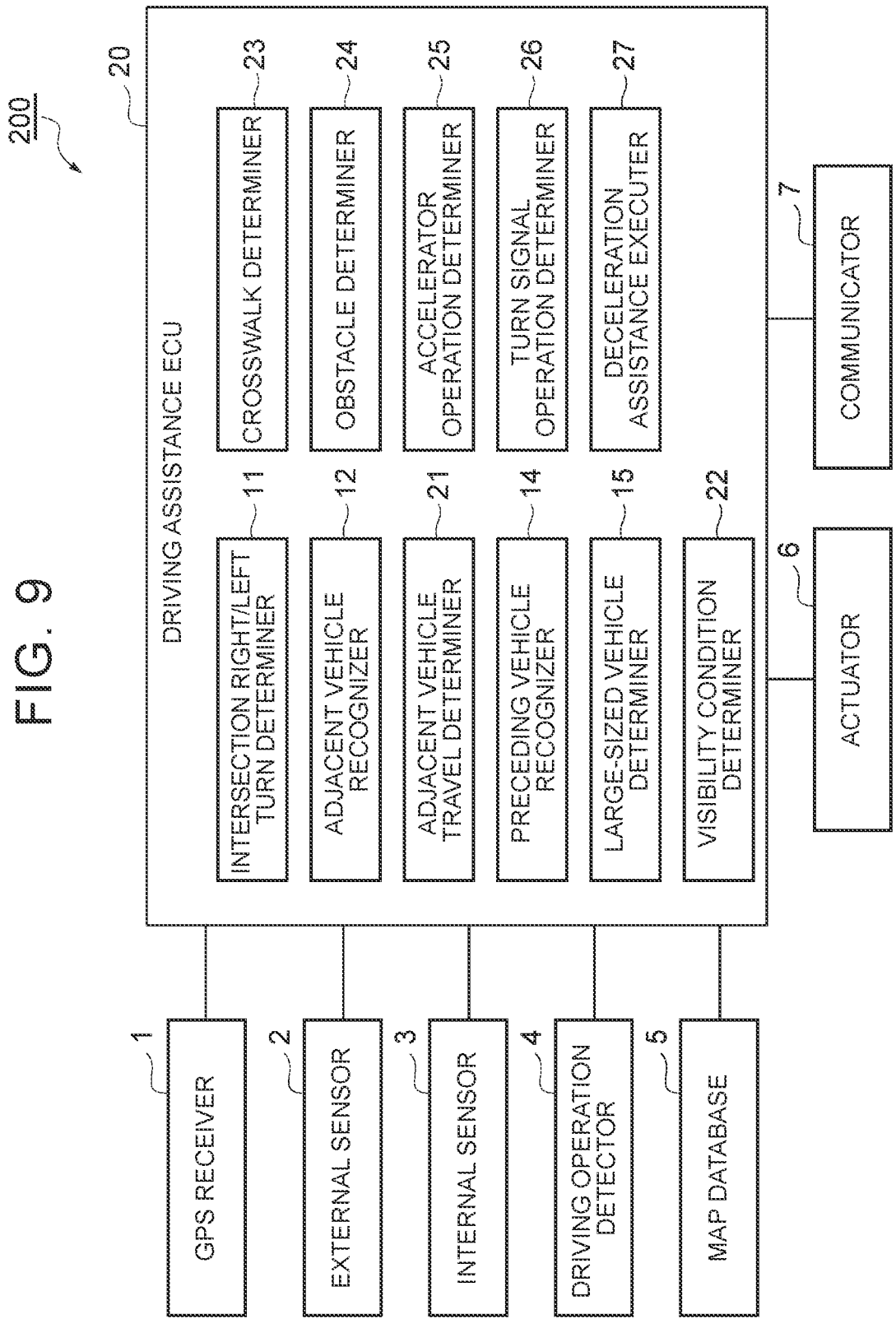
FIG. 9 is a block diagram illustrating a driving assistance device according to a second embodiment.

FIG. 9 is a block diagram illustrating the driving assistance device according to the second embodiment. A driving assistance ECU 20 of a driving assistance device 200 according to the second embodiment illustrated in FIG. 9 is different from the driving assistance ECU according to the first embodiment in that an adjacent vehicle travel determiner (adjacent vehicle travel determination unit) 21 and a deceleration assistance executer (deceleration assistance execution unit) 27 have additional functions and the driving assistance ECU 20 includes a visibility condition determiner (visibility condition determination unit) 22, a crosswalk determiner (crosswalk determination unit) 23, an obstacle determiner (obstacle determination unit) 24, an accelerator operation determiner (accelerator operation determination unit) 25, and a turn signal operation determiner (turn signal operation determination unit) 26.

When determination is made that the adjacent vehicle turns in the same direction as that of the driver's vehicle, the adjacent vehicle travel determiner 21 determines whether the driver's vehicle turns outside or inside the adjacent vehicle. The adjacent vehicle travel determiner 21 makes the above determination based on a detection result from the external sensor 2.

Figure 10:
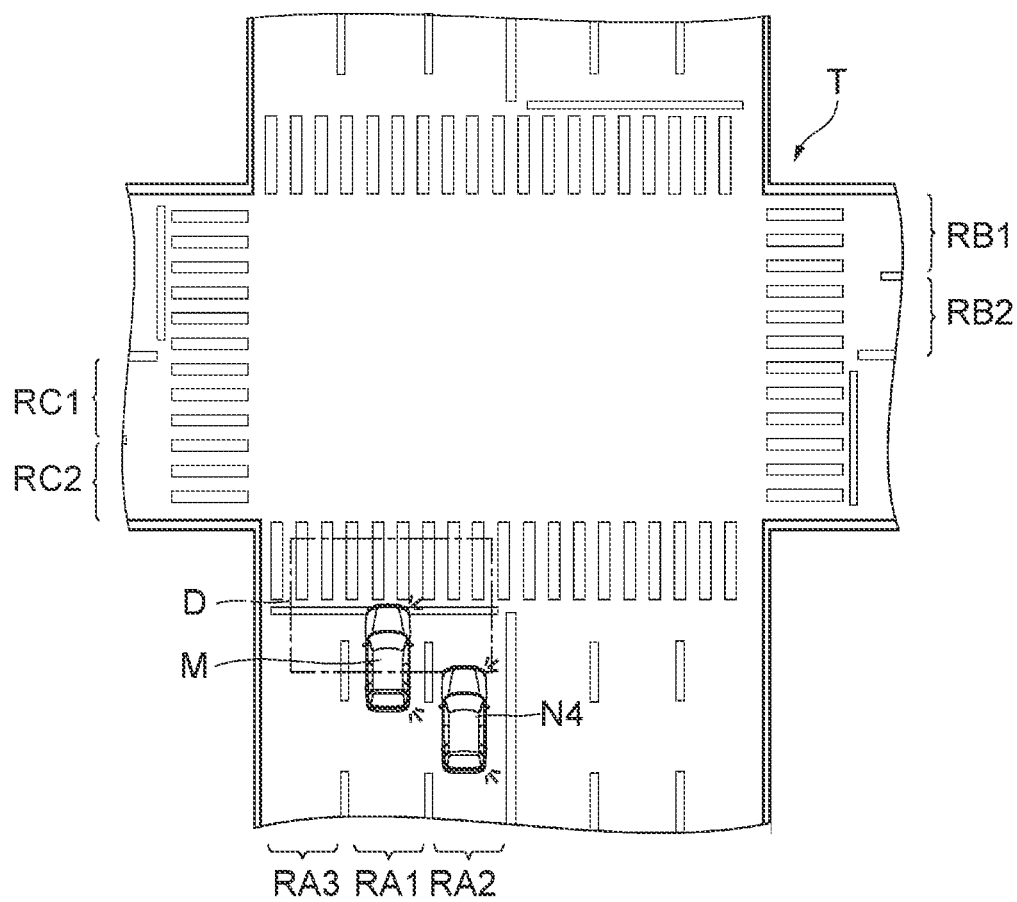
FIG. 10 is a plan view illustrating an example of a situation in which the driver's vehicle turns outside the adjacent vehicle.
Figure 11:
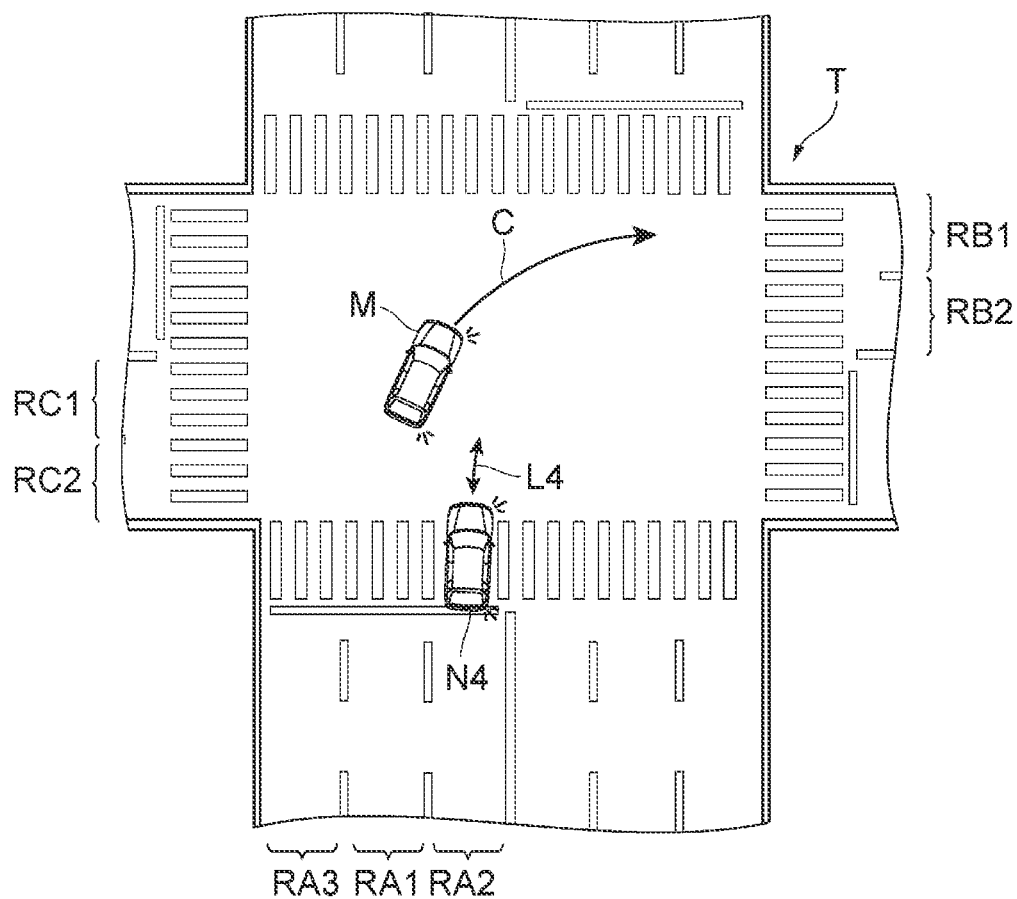
FIG. 11 is a plan view illustrating a situation in which the driver's vehicle turns at an intersection ahead of the adjacent vehicle.

FIG. 10 is a plan view illustrating an example of a situation in which the driver's vehicle turns outside the adjacent vehicle. FIG. 11 is a plan view illustrating a situation in which the driver's vehicle turns at the intersection ahead of the adjacent vehicle. As illustrated in FIGS. 10 and 11, when the driver's vehicle M and an adjacent vehicle N4 turn right at the intersection T, the driver's vehicle M traveling in the lane RA1 (traveling lane RA1) located on the left side of the lane RA2 (adjacent lane RA2) where the adjacent vehicle N4 is traveling turns outside the adjacent vehicle N4. Therefore, in the situation illustrated in FIG. 10, the adjacent vehicle travel determiner 21 determines that the driver's vehicle M turns outside the adjacent vehicle N4.

When determination is made that the driver's vehicle turns outside the adjacent vehicle, the adjacent vehicle travel determiner 21 determines whether the driver's vehicle is expected to pass through the intersection ahead of the adjacent vehicle at a vehicle speed equal to or lower than an upper limit target vehicle speed. The upper limit target vehicle speed is preset according to the purpose of the deceleration assistance during the right or left turn at the intersection. The adjacent vehicle travel determiner 21 makes the above determination based on the detection result from the external sensor 2 by using relative positions and relative vehicle speeds of the driver's vehicle and the adjacent vehicle.

When the driver's vehicle is traveling ahead of the adjacent vehicle at a vehicle speed equal to or lower than the upper limit target vehicle speed and the vehicle-to-vehicle distance between the driver's vehicle and the adjacent vehicle is maintainable to be a distance equal to or larger than the target driver's vehicle-to-adjacent vehicle distance, the adjacent vehicle travel determiner 21 may determine that the driver's vehicle is expected to pass through the intersection ahead of the adjacent vehicle at the vehicle speed equal to or lower than the upper limit target vehicle speed. Alternatively, when the driver's vehicle is travelable ahead of the adjacent vehicle at a vehicle speed equal to or lower than the upper limit target vehicle speed, the adjacent vehicle travel determiner 21 may determine that the driver's vehicle is expected to pass through the intersection ahead of the adjacent vehicle at the vehicle speed equal to or lower than the upper limit target vehicle speed though the vehicle-to-vehicle distance is smaller than the target driver's vehicle-to-adjacent vehicle distance.

Figure 12:
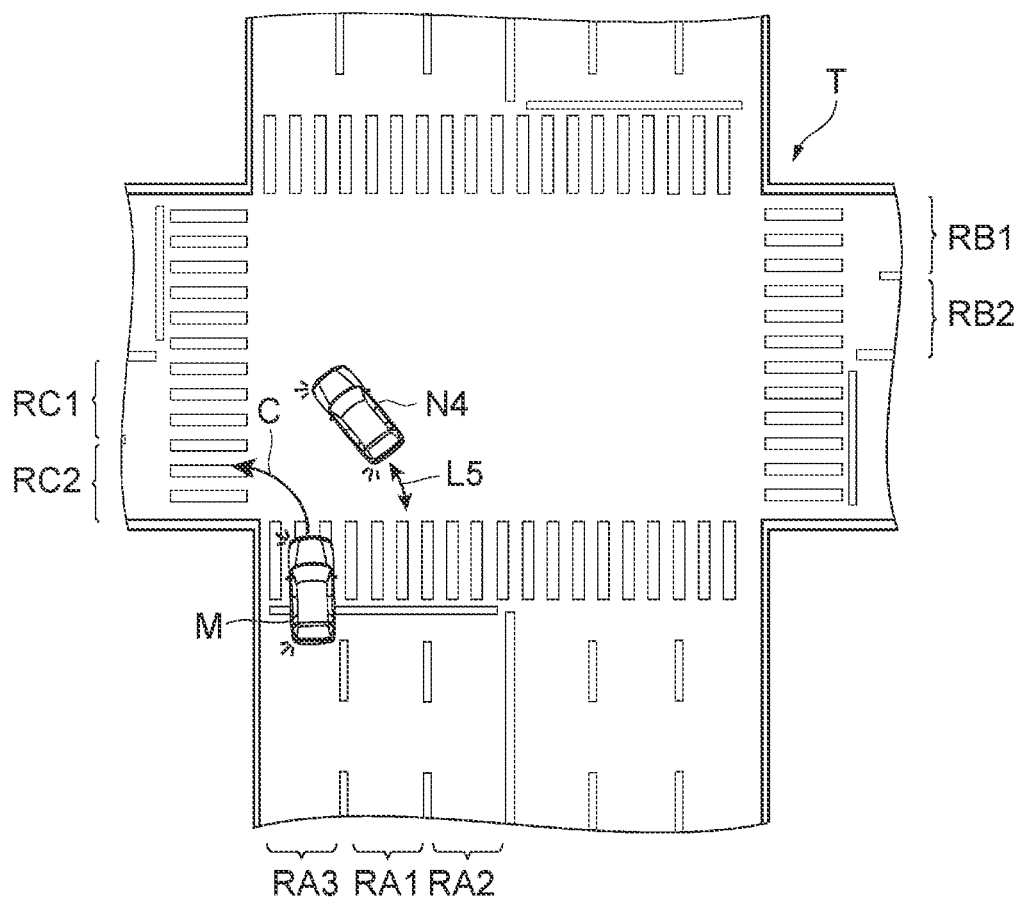
FIG. 12 is a plan view illustrating an example of a situation in which the driver's vehicle turns inside the adjacent vehicle.

FIG. 12 is a plan view illustrating an example of a situation in which the driver's vehicle turns inside the adjacent vehicle. In FIG. 12, the lane RA3 (traveling lane RA3) where the driver's vehicle M is traveling is located on the left side of the lane RA1 (adjacent lane RA1) where an adjacent vehicle N4 is traveling.

In the situation illustrated in FIG. 12, when the driver's vehicle M and the adjacent vehicle N4 turn left at the intersection T, the driver's vehicle M traveling in the lane RA3 located on the left side of the lane RA1 where the adjacent vehicle N4 is traveling turns inside the adjacent vehicle N4. Therefore, in the situation illustrated in FIG. 12, the adjacent vehicle travel determiner 21 determines that the driver's vehicle M turns inside the adjacent vehicle N4.

The visibility condition determiner 22 determines whether a visibility impairment situation occurs around the driver's vehicle. The visibility condition determiner 22 makes the above determination based on at least one of an image captured by the external camera of the driver's vehicle, a wiper operation status of the driver's vehicle, a high beam lighting status of headlights of the driver's vehicle, weather information around the driver's vehicle that is acquired from the communication network, and traffic-related information around the driver's vehicle that is acquired from the communication network.

The visibility impairment situation is a situation in which the driver's visibility level has decreased. The visibility impairment situation includes at least one of a bad weather condition such as rain, snow, or typhoons, a poor vision condition due to an intersection having a shape of poor vision, a backlight condition due to sunset or road surface reflection, and a dark condition due to nighttime or a shadow of a building structure.

The bad weather condition can be determined based on at least one of the image captured by the external camera of the driver's vehicle, the wiper operation status of the driver's vehicle, and the weather information around the driver's vehicle that is acquired from the communication network. The poor vision condition can be determined based on the image captured by the external camera of the driver's vehicle or the traffic-related information around the driver's vehicle that is acquired from the communication network. The poor vision condition may be determined by using the position information of the driver's vehicle and the map information. The backlight condition can be determined based on the image captured by the external camera of the driver's vehicle. The dark condition can be determined based on the image captured by the external camera of the driver's vehicle or the high beam lighting status of the headlights of the driver's vehicle.

The crosswalk determiner 23 determines whether a crosswalk is present at a point to be reached after the right or left turn of the driver's vehicle. The crosswalk determiner 23 makes the above determination based on at least one of a position of the driver's vehicle on a map and the map information in the map database 5, a detection result from the external sensor 2, and the traffic-related information around the driver's vehicle that is acquired from the communication network. The external sensor recognizes the crosswalk at the point to be reached after the right or left turn by, for example, image recognition using the external camera. In this case, the traffic-related information includes information related to elements such as crosswalks and traffic lights at intersections.

The obstacle determiner 24 determines whether an obstacle is present at the point to be reached after the right or left turn of the driver's vehicle. The obstacle determiner 24 makes the above determination based on at least one of the detection result from the external sensor 2, surrounding environment information acquired by vehicle-to-vehicle communication with other vehicles around the driver's vehicle, and the traffic-related information around the driver's vehicle that is acquired from the communication network. Examples of the obstacle include a stationary vehicle (including a vehicle that is temporarily stopped due to a traffic jam), a parked vehicle, a pedestrian, and a bicycle on a road to be reached after the right or left turn.

The surrounding environment information acquired by the vehicle-to-vehicle communication with other vehicles around the driver's vehicle is, for example, image information around a preceding vehicle ahead of the driver's vehicle that is acquired from the preceding vehicle and obtained by an external camera of the preceding vehicle. The obstacle determiner 24 may directly acquire information on an obstacle recognized by the preceding vehicle or the like as the surrounding environment information acquired by the vehicle-to-vehicle communication. In this case, the traffic-related information includes image information obtained by an intersection imaging camera that images the intersection from above. Various other methods can be adopted for recognizing obstacles.

The accelerator operation determiner 25 determines whether an accelerator release timing of the driver for the right or left turn at the intersection is earlier than a first timing threshold. The accelerator operation determiner 25 makes the above determination based on the position of the driver's vehicle on the map, the map information in the map database 5, and a result of detection of the driver's driving operation by the driving operation detector 4.

The accelerator release timing is a timing at which the driver releases the accelerator pedal before turning right or left at the intersection. The accelerator operation determiner 25 determines the accelerator release timing based on the remaining arrival period required for the driver's vehicle to reach the intersection or an arrival distance to the intersection from the driver's vehicle. The remaining arrival period may be recognized as a time to collision (TTC) targeted for the intersection.

The first timing threshold is a preset threshold. The first timing threshold can be, for example, a timing at which a statistically general driver releases an accelerator pedal when turning right or left at an intersection. The first timing threshold may be different values depending on whether the driver's vehicle turns right or left.

The turn signal operation determiner 26 determines whether a turn signal operation timing of the driver for the right or left turn at the intersection is earlier than a second timing threshold. The turn signal operation determiner 26 makes the above determination based on the position of the driver's vehicle on the map, the map information in the map database 5, and a result of detection of the driver's turn signal operation by the driving operation detector 4.

The turn signal operation timing is a timing at which the driver operates the turn signal before turning right or left at the intersection. The turn signal operation determiner 26 determines the turn signal operation timing based on the remaining arrival period required for the driver's vehicle to reach the intersection or the arrival distance to the intersection from the driver's vehicle.

The second timing threshold is a preset threshold. The second timing threshold can be, for example, a timing at which a statistically general driver operates a turn signal when turning right or left at an intersection. The second timing threshold may be different values depending on whether the driver's vehicle turns right or left.

When the adjacent vehicle travel determiner 21 determines that the driver's vehicle is expected to pass through the intersection ahead of the adjacent vehicle at a vehicle speed equal to or lower than the upper limit target vehicle speed, the deceleration assistance executer 27 adjusts the target vehicle speed in the deceleration assistance to cause the driver's vehicle to pass through the intersection ahead of the adjacent vehicle. Specifically, the deceleration assistance executer 27 assists the deceleration to cause the driver's vehicle M to pass through the intersection ahead of the adjacent vehicle N4 as illustrated in FIG. 11 by adjusting the target vehicle speed in the deceleration assistance in the situation illustrated in FIG. 10. The deceleration assistance executer 27 assists the deceleration to cause a vehicle-to-vehicle distance L4 between the driver's vehicle M and the adjacent vehicle N4 to reach a distance equal to or larger than the target driver's vehicle-to-adjacent vehicle distance.

The deceleration assistance executer 27 may prioritize the preceding travel of the driver's vehicle over the target driver's vehicle-to-adjacent vehicle distance. That is, the deceleration assistance executer 27 may prioritize the turn of the driver's vehicle M ahead of the adjacent vehicle N4 even if the vehicle-to-vehicle distance L4 between the driver's vehicle M and the adjacent vehicle N4 in FIG. 11 is smaller than the target driver's vehicle-to-adjacent vehicle distance.

When the driver's accelerator operation is detected, the deceleration assistance executer 27 may adjust the target vehicle-to-vehicle distance of the deceleration assistance while prioritizing the preceding travel of the driver's vehicle over the target driver's vehicle-to-adjacent vehicle distance. When the driver's accelerator operation is not detected, the deceleration assistance executer 27 may cause the adjacent vehicle to travel ahead of the driver's vehicle while prioritizing the situation in which the vehicle-to-vehicle distance between the driver's vehicle and the adjacent vehicle reaches a distance equal to or larger than the target driver's vehicle-to-adjacent vehicle distance. The deceleration assistance executer 27 may prioritize the preceding travel of the driver's vehicle over adjustment of the target vehicle speed under various conditions described later.

As illustrated in FIG. 12, when the adjacent vehicle travel determiner 21 determines that the driver's vehicle M turns inside the adjacent vehicle N4, the driver's vehicle M need not travel ahead of the adjacent vehicle N4 because the visibility of the driver of the driver's vehicle M in the traveling direction is not obstructed by the preceding travel of the adjacent vehicle N4. Therefore, the deceleration assistance executer 27 assists the deceleration to cause the vehicle-to-vehicle distance between the driver's vehicle M and the adjacent vehicle N4 to reach a distance equal to or larger than the target driver's vehicle-to-adjacent vehicle distance.

When the visibility condition determiner 22 determines that the visibility impairment situation occurs around the driver's vehicle, the deceleration assistance executer 27 reduces the target vehicle speed in the deceleration assistance as compared with a case where determination is not made that the visibility impairment situation occurs around the driver's vehicle. The deceleration assistance executer 27 reduces the target vehicle speed by a preset fixed amount or at a preset fixed rate. The deceleration assistance executer 27 may change the reduction amount or rate of the target vehicle speed depending on the type of the visibility impairment situation.

When the crosswalk determiner 23 determines that a crosswalk is present at a point to be reached after the right or left turn of the driver's vehicle, the deceleration assistance executer 27 reduces the target vehicle speed in the deceleration assistance as compared with a case where determination is not made that the crosswalk is present at the point to be reached after the right or left turn of the driver's vehicle. The deceleration assistance executer 27 reduces the target vehicle speed by the preset fixed amount or at the preset fixed rate.

When the obstacle determiner 24 determines that an obstacle is present at a point to be reached after the right or left turn of the driver's vehicle, the deceleration assistance executer 27 reduces the target vehicle speed in the deceleration assistance as compared with a case where determination is not made that the obstacle is present at the point to be reached after the right or left turn of the driver's vehicle. The deceleration assistance executer 27 reduces the target vehicle speed by the preset fixed amount or at the preset fixed rate. The deceleration assistance executer 27 may change the reduction amount or rate of the target vehicle speed depending on the type of the obstacle.

When the accelerator operation determiner 25 determines that the accelerator release timing of the driver for the right or left turn at the intersection is earlier than the first timing threshold, the deceleration assistance executer 27 reduces the target vehicle speed in the deceleration assistance as compared with a case where determination is not made that the accelerator release timing of the driver is earlier than the first timing threshold. The deceleration assistance executer 27 reduces the target vehicle speed by the preset fixed amount or at the preset fixed rate. The deceleration assistance executer 27 may gradually reduce the target vehicle speed by setting a plurality of thresholds.

When the turn signal operation determiner 26 determines that the turn signal operation timing of the driver for the right or left turn at the intersection is earlier than the second timing threshold, the deceleration assistance executer 27 reduces the target vehicle speed in the deceleration assistance as compared with a case where determination is not made that the turn signal operation timing of the driver is earlier than the second timing threshold. The deceleration assistance executer 27 reduces the target vehicle speed by the preset fixed amount or at the preset fixed rate. The deceleration assistance executer 27 may gradually reduce the target vehicle speed by setting a plurality of thresholds. The deceleration assistance executer 27 does not reduce the target vehicle speed to a value equal to or lower than a preset lower limit target vehicle speed.

When the right or left turn is made from a road with a large number of lanes to a road with a small number of lanes based on the shape of the intersection, the deceleration assistance executer 27 may reduce the target vehicle speed in the deceleration assistance as compared with a case where the right or left turn is made from a road with a small number of lanes to a road with a large number of lanes. The deceleration assistance executer 27 may change the target driver's vehicle-to-preceding vehicle distance and/or the target driver's vehicle-to-adjacent vehicle distance to a large value instead of reducing the target vehicle speed as described above.

Control of Driving Assistance Device of Second Embodiment

Figure 13:
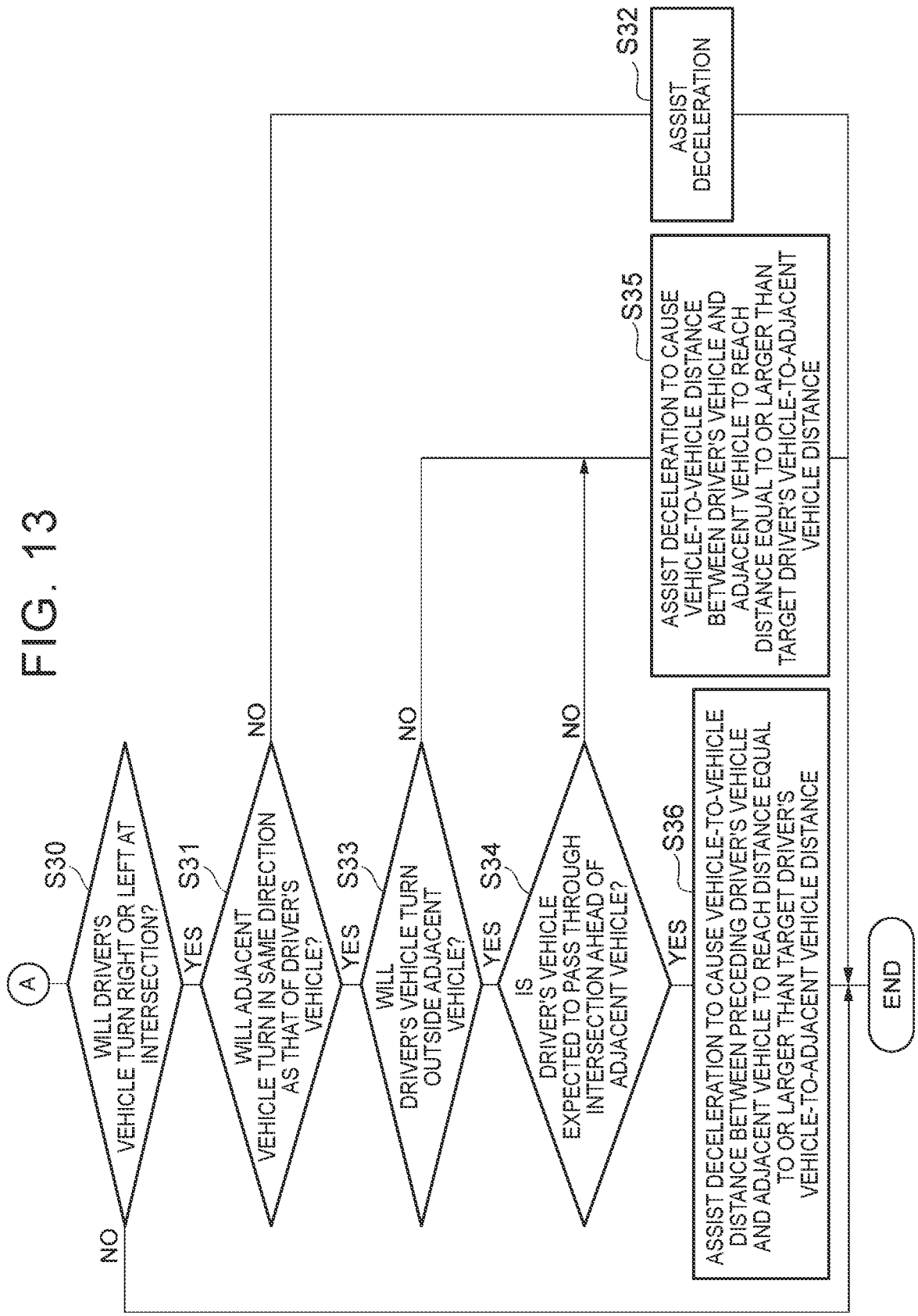
FIG. 13 is a flowchart illustrating continuation of a deceleration assistance execution process according to the second embodiment.

Next, control (processes) of the driving assistance device 200 according to the second embodiment will be described with reference to the drawings. FIG. 13 is a flowchart illustrating continuation of a deceleration assistance execution process according to the second embodiment. The flowchart illustrated in FIG. 13 is another example that is continuation of the flowchart of FIG. 7.

In S30 of FIG. 13, the driving assistance ECU 20 of the driving assistance device 200 causes the intersection right/left turn determiner 11 to determine whether the driver's vehicle turns right or left at the intersection. When determination is made that the driver's vehicle turns right or left at the intersection (S30: YES), the driving assistance ECU 20 proceeds to S31. When determination is not made that the driver's vehicle turns right or left at the intersection (S30: NO), the driving assistance ECU 20 terminates the current deceleration assistance execution process. Then, the driving assistance ECU 20 repeats the process from S10 (FIG. 7) after the predetermined period has elapsed.

In S31, the driving assistance ECU 20 causes the adjacent vehicle travel determiner 21 to determine whether the adjacent vehicle turns in the same direction as that of the driver's vehicle. When determination is made that the adjacent vehicle turns in the same direction as that of the driver's vehicle (S31: YES), the driving assistance ECU 20 proceeds to S33. When determination is not made that the adjacent vehicle turns in the same direction as that of the driver's vehicle (S31: NO), the driving assistance ECU 20 proceeds to S32.

In S32, the driving assistance ECU 20 causes the deceleration assistance executer 27 to assist the deceleration. When the target driver's vehicle-to-preceding vehicle distance for an ordinary-sized vehicle or the target driver's vehicle-to-preceding vehicle distance for a large-sized vehicle is set, the deceleration is assisted to cause the vehicle-to-vehicle distance between the preceding vehicle and the driver's vehicle to reach a distance equal to or larger than the set target driver's vehicle-to-preceding vehicle distance. Then, the driving assistance ECU 20 terminates the current deceleration assistance execution process. The driving assistance ECU 20 repeats the process from S10 after the predetermined period has elapsed.

In S33, the driving assistance ECU 20 causes the adjacent vehicle travel determiner 21 to determine whether the driver's vehicle turns outside or inside the adjacent vehicle. The adjacent vehicle travel determiner 21 makes the above determination based on a detection result from the external sensor 2. When determination is made that the driver's vehicle turns outside the adjacent vehicle (S33: YES), the driving assistance ECU 20 proceeds to S34. When determination is not made that the driver's vehicle turns outside the adjacent vehicle (S33: NO), the driving assistance ECU 20 proceeds to S35.

In S34, the driving assistance ECU 20 causes the adjacent vehicle travel determiner 21 to determine whether the driver's vehicle is expected to pass through the intersection ahead of the adjacent vehicle at a vehicle speed equal to or lower than the upper limit target vehicle speed. The adjacent vehicle travel determiner 21 makes the above determination based on the detection result from the external sensor 2 by using relative positions and relative vehicle speeds of the driver's vehicle and the adjacent vehicle. When determination is made that the driver's vehicle is expected to pass through the intersection ahead of the adjacent vehicle at the vehicle speed equal to or lower than the upper limit target vehicle speed (S34: YES), the driving assistance ECU 20 proceeds to S36. When determination is not made that the driver's vehicle is expected to pass through the intersection ahead of the adjacent vehicle at the vehicle speed equal to or lower than the upper limit target vehicle speed (S34: NO), the driving assistance ECU 20 proceeds to S35.

In S35, the driving assistance ECU 20 causes the deceleration assistance executer 27 to assist the deceleration to cause the vehicle-to-vehicle distance between the driver's vehicle and the adjacent vehicle to reach a distance equal to or larger than the target driver's vehicle-to-adjacent vehicle distance. In this case, the driver's vehicle may travel ahead or the adjacent vehicle may travel ahead. Then, the driving assistance ECU 20 terminates the current deceleration assistance execution process. The driving assistance ECU 20 repeats the process from S10 after the predetermined period has elapsed.

In S36, the driving assistance ECU 20 causes the deceleration assistance executer 27 to assist the deceleration to cause the vehicle-to-vehicle distance between the preceding driver's vehicle and the adjacent vehicle to reach a distance equal to or larger than the target driver's vehicle-to-adjacent vehicle distance. The deceleration assistance executer 27 may prioritize the preceding travel of the driver's vehicle over the situation in which the vehicle-to-vehicle distance is made equal to or larger than the target driver's vehicle-to-adjacent vehicle distance. Then, the driving assistance ECU 20 terminates the current deceleration assistance execution process. The driving assistance ECU 20 repeats the process from S10 after the predetermined period has elapsed.

FIG. 14A is a flowchart illustrating an example of a visibility impairment situation determination process. The visibility impairment situation determination process illustrated in FIG. 14A is executed, for example, when determination is made that the driver's vehicle turns right or left at the intersection.

As illustrated in FIG. 14A, the driving assistance ECU 20 causes the visibility condition determiner 22 to determine in S40 whether the visibility impairment situation occurs around the driver's vehicle. When determination is made that the visibility impairment situation occurs around the driver's vehicle (S40: YES), the driving assistance ECU 20 proceeds to S41. When determination is not made that the visibility impairment situation occurs around the driver's vehicle (S40: NO), the driving assistance ECU 20 terminates the current process.

In S41, the driving assistance ECU 20 causes the deceleration assistance executer 27 to reduce the target vehicle speed in the deceleration assistance. For example, the deceleration assistance executer 27 reduces the target vehicle speed by the preset fixed amount or at the preset fixed rate.

FIG. 14B is a flowchart illustrating an example of a crosswalk determination process. The crosswalk determination process illustrated in FIG. 14B is executed, for example, when determination is made that the driver's vehicle turns right or left at the intersection.

As illustrated in FIG. 14B, the driving assistance ECU 20 causes the crosswalk determiner 23 to determine in S50 whether a crosswalk is present at a point to be reached after the right or left turn of the driver's vehicle. When determination is made that the crosswalk is present at the point to be reached after the right or left turn of the driver's vehicle (S50: YES), the driving assistance ECU 20 proceeds to S51. When determination is not made that the crosswalk is present at the point to be reached after the right or left turn of the driver's vehicle (S50: NO), the driving assistance ECU 20 terminates the current process.

In S51, the driving assistance ECU 20 causes the deceleration assistance executer 27 to reduce the target vehicle speed in the deceleration assistance. For example, the deceleration assistance executer 27 reduces the target vehicle speed by the preset fixed amount or at the preset fixed rate.

FIG. 14C is a flowchart illustrating an example of an obstacle determination process. The obstacle determination process illustrated in FIG. 14C is executed, for example, when determination is made that the driver's vehicle turns right or left at the intersection.

As illustrated in FIG. 14C, the driving assistance ECU 20 causes the obstacle determiner 24 to determine in S60 whether an obstacle is present at a point to be reached after the right or left turn of the driver's vehicle. When determination is made that the obstacle is present at the point to be reached after the right or left turn of the driver's vehicle (S60: YES), the driving assistance ECU 20 proceeds to S61. When determination is not made that the obstacle is present at the point to be reached after the right or left turn of the driver's vehicle (S60: NO), the driving assistance ECU 20 terminates the current process.

In S61, the driving assistance ECU 20 causes the deceleration assistance executer 27 to reduce the target vehicle speed in the deceleration assistance. For example, the deceleration assistance executer 27 reduces the target vehicle speed by the preset fixed amount or at the preset fixed rate.

FIG. 15A is a flowchart illustrating an example of an accelerator release determination process. The accelerator release determination process illustrated in FIG. 15A is executed, for example, when determination is made that the driver's vehicle turns right or left at the intersection.

As illustrated in FIG. 15A, the driving assistance ECU 20 causes the accelerator operation determiner 25 to determine in S70 whether the accelerator release timing of the driver is earlier than the first timing threshold. When determination is made that the accelerator release timing of the driver is earlier than the first timing threshold (S70: YES), the driving assistance ECU 20 proceeds to S71. When determination is not made that the accelerator release timing of the driver is earlier than the first timing threshold (S70: NO), the driving assistance ECU 20 terminates the current process.

In S71, the driving assistance ECU 20 causes the deceleration assistance executer 27 to reduce the target vehicle speed in the deceleration assistance. For example, the deceleration assistance executer 27 reduces the target vehicle speed by the preset fixed amount or at the preset fixed rate.

FIG. 15B is a flowchart illustrating an example of a turn signal operation timing determination process. The turn signal operation timing determination process illustrated in FIG. 15B is executed, for example, when determination is made that the driver's vehicle turns right or left at the intersection.

As illustrated in FIG. 15B, the driving assistance ECU 20 causes the turn signal operation determiner 26 to determine in S80 whether the turn signal operation timing of the driver is earlier than the second timing threshold. When determination is made that the turn signal operation timing of the driver is earlier than the second timing threshold (S80: YES), the driving assistance ECU 20 proceeds to S81. When determination is not made that the turn signal operation timing of the driver is earlier than the second timing threshold (S80: NO), the driving assistance ECU 20 terminates the current process.

In S81, the driving assistance ECU 20 causes the deceleration assistance executer 27 to reduce the target vehicle speed in the deceleration assistance. For example, the deceleration assistance executer 27 reduces the target vehicle speed by the preset fixed amount or at the preset fixed rate.

According to the driving assistance device 200 of the second embodiment described above, when the adjacent vehicle travel determiner 21 determines that the driver's vehicle turns outside the adjacent vehicle and the driver's vehicle is expected to pass through the intersection ahead of the adjacent vehicle at a vehicle speed equal to or lower than the upper limit target vehicle speed, the target vehicle speed in the deceleration assistance is adjusted to cause the driver's vehicle to pass through the intersection ahead of the adjacent vehicle. Thus, it is possible to reduce the occurrence of the case where the visibility of the driver of the driver's vehicle is obstructed by the preceding travel of the adjacent vehicle when the driver's vehicle turns outside the adjacent vehicle.

According to the driving assistance device 200, when the visibility condition determiner 22 determines that the visibility impairment situation occurs around the driver's vehicle, the target vehicle speed in the deceleration assistance is reduced as compared with the case where determination is not made that the visibility impairment situation occurs around the driver's vehicle. Thus, the driver's discomfort with the deceleration assistance can be reduced as compared with the case where the visibility impairment situation is not taken into consideration.

According to the driving assistance device 200, when the crosswalk determiner 23 determines that a crosswalk is present at a point to be reached after the right or left turn of the driver's vehicle, the target vehicle speed in the deceleration assistance is reduced as compared with the case where determination is not made that the crosswalk is present at the point to be reached after the right or left turn of the driver's vehicle. Thus, the driver's discomfort with the deceleration assistance can be reduced as compared with the case where the presence of the crosswalk is not taken into consideration.

According to the driving assistance device 200, when the obstacle determiner 24 determines that an obstacle is present at a point to be reached after the right or left turn of the driver's vehicle, the target vehicle speed in the deceleration assistance is reduced as compared with the case where determination is not made that the obstacle is present at the point to be reached after the right or left turn of the driver's vehicle. Thus, the driver's discomfort with the deceleration assistance can be reduced as compared with the case where the presence of the obstacle is not taken into consideration.

According to the driving assistance device 200, when the accelerator operation determiner 25 determines that the accelerator release timing is earlier than the first timing threshold, the target vehicle speed in the deceleration assistance is reduced as compared with the case where determination is not made that the accelerator release timing is earlier than the first timing threshold. Thus, the driver's discomfort with the deceleration assistance can be reduced as compared with the case where the accelerator release timing is not taken into consideration.

According to the driving assistance device 200, when the turn signal operation determiner 26 determines that the turn signal operation timing is earlier than the second timing threshold, the target vehicle speed in the deceleration assistance is reduced as compared with the case where determination is not made that the turn signal operation timing is earlier than the second timing threshold. Thus, the driver's discomfort with the deceleration assistance can be reduced as compared with the case where the turn signal operation timing is not taken into consideration.

Although the embodiments of the present disclosure have been described above, the present disclosure is not limited to the embodiments described above. The present disclosure may be carried out in various forms having various changes and improvements based on the knowledge of those skilled in the art, including the embodiments described above.

The driving assistance devices 100 and 200 need not determine whether the preceding vehicle is a large-sized vehicle. The driving assistance devices 100 and 200 may assist the deceleration by using the same target driver's vehicle-to-preceding vehicle distance regardless of the size of the preceding vehicle. The driving assistance devices 100 and 200 need not assist the deceleration in consideration of the presence of the preceding vehicle. In this case, the driving assistance ECUs 10 and 20 need not have the preceding vehicle recognizer 14 and the large-sized vehicle determiner 15.

The driving assistance device 200 need not have the visibility condition determiner 22, the crosswalk determiner 23, the obstacle determiner 24, the accelerator operation determiner 25, and the turn signal operation determiner 26. The driving assistance device 200 may have any one or none of the visibility condition determiner 22, the crosswalk determiner 23, the obstacle determiner 24, the accelerator operation determiner 25, and the turn signal operation determiner 26.

What is claimed is:

1. A driving assistance device configured to execute deceleration assistance for a driver's vehicle when the driver's vehicle turns right or left at an intersection, the driving assistance device comprising:
    an adjacent vehicle recognizer configured to recognize, based on a detection result from an external sensor of the driver's vehicle, an adjacent vehicle traveling in an adjacent lane that is adjacent to a traveling lane of the driver's vehicle;
    an adjacent vehicle travel determiner configured to determine whether the adjacent vehicle turns in the same direction of the driver's vehicle at the intersection based on adjacent vehicle information acquired by vehicle-to-vehicle communication with the adjacent vehicle or the detection result from the external sensor when the adjacent vehicle is recognized by the adjacent vehicle recognizer and the driver's vehicle turns right or left at the intersection;
    a deceleration assistance executer configured to execute the deceleration assistance to cause a vehicle-to-vehicle distance between the driver's vehicle and the adjacent vehicle in a traveling direction of the driver's vehicle to reach a distance equal to or larger than a preset target driver's vehicle-to-adjacent vehicle distance when the adjacent vehicle travel determiner determines that the adjacent vehicle turns in the same direction of the driver's vehicle;
    a driving operation detector configured to detect a driving operation of a driver of the driver's vehicle; and
    an accelerator operation determiner configured to determine whether an accelerator release timing of the driver for a right or left turn at the intersection is earlier than a first timing threshold based on a position of the driver's vehicle on a map, map information, and a result of detection of the driving operation of the driver by the driving operation detector,
    wherein the deceleration assistance executer is configured to reduce a target vehicle speed in the deceleration assistance when the accelerator operation determiner determines that the accelerator release timing is earlier than the first timing threshold as compared with a case where the accelerator operation determiner does not determine that the accelerator release timing is earlier than the first timing threshold.

2. The driving assistance device according to claim 1, further comprising:
    a preceding vehicle recognizer configured to recognize, based on the detection result from the external sensor, a preceding vehicle traveling ahead of the driver's vehicle; and
    a large-sized vehicle determiner configured to determine whether the preceding vehicle is a large-sized vehicle based on preceding vehicle information acquired by vehicle-to-vehicle communication with the preceding vehicle or the detection result from the external sensor when the preceding vehicle is recognized by the preceding vehicle recognizer,
    wherein the deceleration assistance executer is configured to execute the deceleration assistance to increase a vehicle-to-vehicle distance between the driver's vehicle and the preceding vehicle when the large-sized vehicle determiner determines that the preceding vehicle is the large-sized vehicle as compared with a case where the large-sized vehicle determiner does not determine that the preceding vehicle is the large-sized vehicle.

3. The driving assistance device according to claim 1, further comprising a visibility condition determiner configured to determine whether a visibility impairment situation occurs around the driver's vehicle based on at least one of an image captured by an external camera of the driver's vehicle, a wiper operation status of the driver's vehicle, a high beam lighting status of a headlight of the driver's vehicle, weather information around the driver's vehicle that is acquired from a communication network, and traffic-related information around the driver's vehicle that is acquired from the communication network,
    wherein the deceleration assistance executer is configured to reduce the target vehicle speed in the deceleration assistance when the visibility condition determiner determines that the visibility impairment situation occurs around the driver's vehicle as compared with a case where the visibility condition determiner does not determine that the visibility impairment situation occurs around the driver's vehicle.

4. The driving assistance device according to claim 1, further comprising a crosswalk determiner configured to determine whether a crosswalk is present at a point to be reached after a right or left turn of the driver's vehicle based on at least one of a position of the driver's vehicle on a map and map information, the detection result from the external sensor, and traffic-related information around the driver's vehicle that is acquired from a communication network,
    wherein the deceleration assistance executer is configured to reduce the target vehicle speed in the deceleration assistance when the crosswalk determiner determines that the crosswalk is present at the point to be reached after the right or left turn of the driver's vehicle as compared with a case where the crosswalk determiner does not determine that the crosswalk is present at the point to be reached after the right or left turn of the driver's vehicle.

5. The driving assistance device according to claim 1, further comprising an obstacle determiner configured to determine whether an obstacle is present at a point to be reached after a right or left turn of the driver's vehicle based on at least one of the detection result from the external sensor, surrounding environment information acquired by vehicle-to-vehicle communication with other vehicles around the driver's vehicle, and traffic-related information around the driver's vehicle that is acquired from a communication network,
    wherein the deceleration assistance executer is configured to reduce the target vehicle speed in the deceleration assistance when the obstacle determiner determines that the obstacle is present at the point to be reached after the right or left turn of the driver's vehicle as compared with a case where the obstacle determiner does not determine that the obstacle is present at the point to be reached after the right or left turn of the driver's vehicle.

6. The driving assistance device according to claim 1, further comprising:
    a turn signal operation determiner configured to determine whether a turn signal operation timing of the driver for a right or left turn at the intersection is earlier than a second timing threshold based on a position of the driver's vehicle on a map, map information, and a result of detection of the operation of the driver on the turn signal by the driving operation detector, wherein the driving operation detector is configured to detect at least an operation on a turn signal as the driving operation of the driver of the driver's vehicle; and wherein the deceleration assistance executer is configured to reduce the target vehicle speed in the deceleration assistance when the turn signal operation determiner determines that the turn signal operation timing is earlier than the second timing threshold as compared with a case where the turn signal operation determiner does not determine that the turn signal operation timing is earlier than the second timing threshold.

7. The driving assistance device according to claim 1, wherein:

the adjacent vehicle travel determiner is configured to:
 determine whether the driver's vehicle turns outside or inside the adjacent vehicle when the adjacent vehicle travel determiner determines that the adjacent vehicle turns in the same direction of the driver's vehicle at the intersection, and
 determine whether the driver's vehicle is expected to pass through the intersection ahead of the adjacent vehicle at a vehicle speed equal to or lower than a preset upper limit target vehicle speed based on the detection result from the external sensor when the adjacent vehicle travel determiner determines that the driver's vehicle turns outside the adjacent vehicle; and the deceleration assistance executer is configured to, when the adjacent vehicle travel determiner determines that the driver's vehicle is expected to pass through the intersection ahead of the adjacent vehicle at the vehicle speed equal to or lower than the upper limit target vehicle speed, adjust the target vehicle speed in the deceleration assistance to cause the driver's vehicle to pass through the intersection ahead of the adjacent vehicle.

8. A driving assistance device comprising an electronic control unit configured to:

execute deceleration assistance for a driver's vehicle when the driver's vehicle turns right or left at an intersection;

recognize, based on a detection result from an external sensor of the driver's vehicle, an adjacent vehicle traveling in an adjacent lane that is adjacent to a traveling lane of the driver's vehicle;

determine whether the adjacent vehicle turns in the same direction of the driver's vehicle at the intersection based on adjacent vehicle information acquired by vehicle-to-vehicle communication with the adjacent vehicle or the detection result from the external sensor when the adjacent vehicle is recognized and the driver's vehicle turns right or left at the intersection;

execute the deceleration assistance to cause a vehicle-to-vehicle distance between the driver's vehicle and the adjacent vehicle in a traveling direction of the driver's vehicle to reach a distance equal to or larger than a preset target driver's vehicle-to-adjacent vehicle distance when the electronic control unit does not determine that the adjacent vehicle turns in the same direction of the driver's vehicle;

detect a driving operation of a driver of the driver's vehicle;

determine whether an accelerator release timing of the driver for a right or left turn at the intersection is earlier than a first timing threshold based on a position of the driver's vehicle on a map, map information, and a result of detection of the driving operation of the driver; and reduce a target vehicle speed in the deceleration assistance when the electronic control unit determines that the accelerator release timing is earlier than the first timing threshold as compared with a case where the electronic control unit does not determine that the accelerator release timing is earlier than the first timing threshold.

9. The driving assistance device according to claim 8, wherein the electronic control unit is configured to:

recognize, based on the detection result from the external sensor, a preceding vehicle traveling ahead of the driver's vehicle;

determine whether the preceding vehicle is a large-sized vehicle based on preceding vehicle information acquired by vehicle-to-vehicle communication with the preceding vehicle or the detection result from the external sensor when the preceding vehicle is recognized; and execute the deceleration assistance to increase a vehicle-to-vehicle distance between the driver's vehicle and the preceding vehicle when the electronic control unit determines that the preceding vehicle is the large-sized vehicle as compared with a case where the electronic control unit does not determine that the preceding vehicle is the large-sized vehicle.

10. The driving assistance device according to claim 8, wherein the electronic control unit is configured to:

determine whether a visibility impairment situation occurs around the driver's vehicle based on at least one of an image captured by an external camera of the driver's vehicle, a wiper operation status of the driver's vehicle, a high beam lighting status of a headlight of the driver's vehicle, weather information around the driver's vehicle that is acquired from a communication network, and traffic-related information around the driver's vehicle that is acquired from the communication network; and reduce the target vehicle speed in the deceleration assistance when the electronic control unit determines that the visibility impairment situation occurs around the driver's vehicle as compared with a case where the electronic control unit does not determine that the visibility impairment situation occurs around the driver's vehicle.

11. The driving assistance device according to claim 8, wherein the electronic control unit is configured to:

determine whether a crosswalk is present at a point to be reached after a right or left turn of the driver's vehicle based on at least one of a position of the driver's vehicle on a map and map information, the detection result from the external sensor, and traffic-related information around the driver's vehicle that is acquired from a communication network; and reduce the target vehicle speed in the deceleration assistance when the electronic control unit determines that the crosswalk is present at the point to be reached after the right or left turn of the driver's vehicle as compared with a case where the electronic control unit does not determine that the crosswalk is present at the point to be reached after the right or left turn of the driver's vehicle.

12. The driving assistance device according to claim 8, wherein the electronic control unit is configured to:
  determine whether an obstacle is present at a point to be reached after a right or left turn of the driver's vehicle based on at least one of the detection result from the external sensor, surrounding environment information acquired by vehicle-to-vehicle communication with other vehicles around the driver's vehicle, and traffic-related information around the driver's vehicle that is acquired from a communication network; and
  reduce the target vehicle speed in the deceleration assistance when the electronic control unit determines that the obstacle is present at the point to be reached after the right or left turn of the driver's vehicle as compared with a case where the electronic control unit does not determine that the obstacle is present at the point to be reached after the right or left turn of the driver's vehicle.

13. The driving assistance device according to claim 8, wherein the electronic control unit is configured to:
  detect at least an operation on a turn signal as the driving operation of the driver of the driver's vehicle;
  determine whether a turn signal operation timing of the driver for a right or left turn at the intersection is earlier than a second timing threshold based on a position of the driver's vehicle on a map, map information, and a result of detection of the operation of the driver on the turn signal; and
  reduce the target vehicle speed in the deceleration assistance when the electronic control unit determines that the turn signal operation timing is earlier than the second timing threshold as compared with a case where the electronic control unit does not determine that the turn signal operation timing is earlier than the second timing threshold.

14. The driving assistance device according to claim 8, wherein the electronic control unit is configured to:
  determine whether the driver's vehicle turns outside or inside the adjacent vehicle when the electronic control unit determines that the adjacent vehicle turns in the same direction of the driver's vehicle at the intersection;
  determine whether the driver's vehicle is expected to pass through the intersection ahead of the adjacent vehicle at a vehicle speed equal to or lower than a preset upper limit target vehicle speed based on the detection result from the external sensor when the electronic control unit determines that the driver's vehicle turns outside the adjacent vehicle; and
  adjust, when the electronic control unit determines that the driver's vehicle is expected to pass through the intersection ahead of the adjacent vehicle at the vehicle speed equal to or lower than the upper limit target vehicle speed, the target vehicle speed in the deceleration assistance to cause the driver's vehicle to pass through the intersection ahead of the adjacent vehicle.

15. A driving assistance device configured to execute deceleration assistance for a driver's vehicle when the driver's vehicle turns right or left at an intersection, the driving assistance device comprising:
  an adjacent vehicle recognizer configured to recognize, based on a detection result from an external sensor of the driver's vehicle, an adjacent vehicle traveling in an adjacent lane that is adjacent to a traveling lane of the driver's vehicle;
  an adjacent vehicle travel determiner configured to determine whether the adjacent vehicle turns in the same direction of the driver's vehicle at the intersection based on adjacent vehicle information acquired by vehicle-to-vehicle communication with the adjacent vehicle or the detection result from the external sensor when the adjacent vehicle is recognized by the adjacent vehicle recognizer and the driver's vehicle turns right or left at the intersection; and
  a deceleration assistance executer configured to execute the deceleration assistance to cause a vehicle-to-vehicle distance between the driver's vehicle and the adjacent vehicle in a traveling direction of the driver's vehicle to reach a distance equal to or larger than a preset target driver's vehicle-to-adjacent vehicle distance when the adjacent vehicle travel determiner determines that the adjacent vehicle turns in the same direction of the driver's vehicle;
  a driving operation detector configured to detect at least an operation on a turn signal as a driving operation of a driver of the driver's vehicle; and
  a turn signal operation determiner configured to determine whether a turn signal operation timing of the driver for a right or left turn at the intersection is earlier than a second timing threshold based on a position of the driver's vehicle on a map, map information, and a result of detection of the operation of the driver on the turn signal by the driving operation detector,
  wherein the deceleration assistance executer is configured to reduce a target vehicle speed in the deceleration assistance when the turn signal operation determiner determines that the turn signal operation timing is earlier than the second timing threshold as compared with a case where the turn signal operation determiner does not determine that the turn signal operation timing is earlier than the second timing threshold.

* * * * *